(12) United States Patent
Takeuchi

(10) Patent No.: US 11,009,441 B2
(45) Date of Patent: May 18, 2021

(54) PARTICULATE DETECTION SENSOR, DUST SENSOR, AIR CONDITIONING DEVICE, AND CONTROL METHOD OF PARTICULATE DETECTION SENSOR

(71) Applicant: SHARP KABUSHIKI KAISHA, Sakai (JP)

(72) Inventor: Noboru Takeuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/748,468

(22) Filed: Jan. 21, 2020

(65) Prior Publication Data

US 2020/0249143 A1 Aug. 6, 2020

Related U.S. Application Data

(60) Provisional application No. 62/800,250, filed on Feb. 1, 2019.

(51) Int. Cl.
*G01N 21/00* (2006.01)
*G01N 15/06* (2006.01)
*G01N 15/00* (2006.01)

(52) U.S. Cl.
CPC ......... *G01N 15/06* (2013.01); *G01N 2015/03* (2013.01); *G01N 2015/0693* (2013.01)

(58) Field of Classification Search
CPC .... G01N 21/53; G01N 21/47; G01N 15/1459; G01N 15/0211; G01N 15/0205
USPC .......................................................... 356/343
See application file for complete search history.

(56) References Cited

U.S. PATENT DOCUMENTS

| | | | |
|---|---|---|---|
| 2010/0194574 A1 | 8/2010 | Monk et al. | |
| 2011/0255087 A1 | 10/2011 | Alexander et al. | |
| 2017/0315046 A1 | 11/2017 | Du et al. | |
| 2019/0146086 A1* | 5/2019 | Sato ...................... | G01S 7/4865 |
| | | | 250/206.1 |
| 2020/0183013 A1* | 6/2020 | Iguchi .................. | G01S 7/4813 |

FOREIGN PATENT DOCUMENTS

| | | |
|---|---|---|
| JP | H07-092075 A | 4/1995 |
| JP | 2000-356583 A | 12/2000 |
| JP | 2012-502260 A | 1/2012 |
| JP | 2012-060012 A | 3/2012 |

* cited by examiner

*Primary Examiner* — Md M Rahman
(74) *Attorney, Agent, or Firm* — ScienBiziP, P.C.

(57) ABSTRACT

A particulate detection sensor that detects concentration of a particulate in a fluid includes a light emitting element, a SPAD array light detecting unit, and a signal processing unit. The signal processing unit calculates the concentration of the particulate based on a first pulse count value in a lighting period and a second pulse count value in a lighting-off period.

17 Claims, 20 Drawing Sheets

FIG. 3

| cell_1 | | | | | | | | | | 30 |
|---|---|---|---|---|---|---|---|---|---|---|
| 0 | 10 | 20 | 30 | 40 | 50 | 60 | 70 | 80 | 90 | |
| 1 | 11 | 21 | 31 | 41 | 51 | 61 | 71 | 81 | 91 | |
| 2 | 12 | 22 | 32 | 42 | 52 | 62 | 72 | 82 | 92 | |
| 3 | 13 | 23 | 33 | 43 | 53 | 63 | 73 | 83 | 93 | |
| 4 | 14 | 24 | 34 | 44 | 54 | 64 | 74 | 84 | 94 | |
| 5 | 15 | 25 | 35 | 45 | 55 | 65 | 75 | 85 | 95 | |
| 6 | 16 | 26 | 36 | 46 | 56 | 66 | 76 | 86 | 96 | |
| 7 | 17 | 27 | 37 | 47 | 57 | 67 | 77 | 87 | 97 | |
| 8 | 18 | 28 | 38 | 48 | 58 | 68 | 78 | 88 | 98 | |
| 9 | 19 | 29 | 39 | 49 | 59 | 69 | 79 | 89 | 99 | |

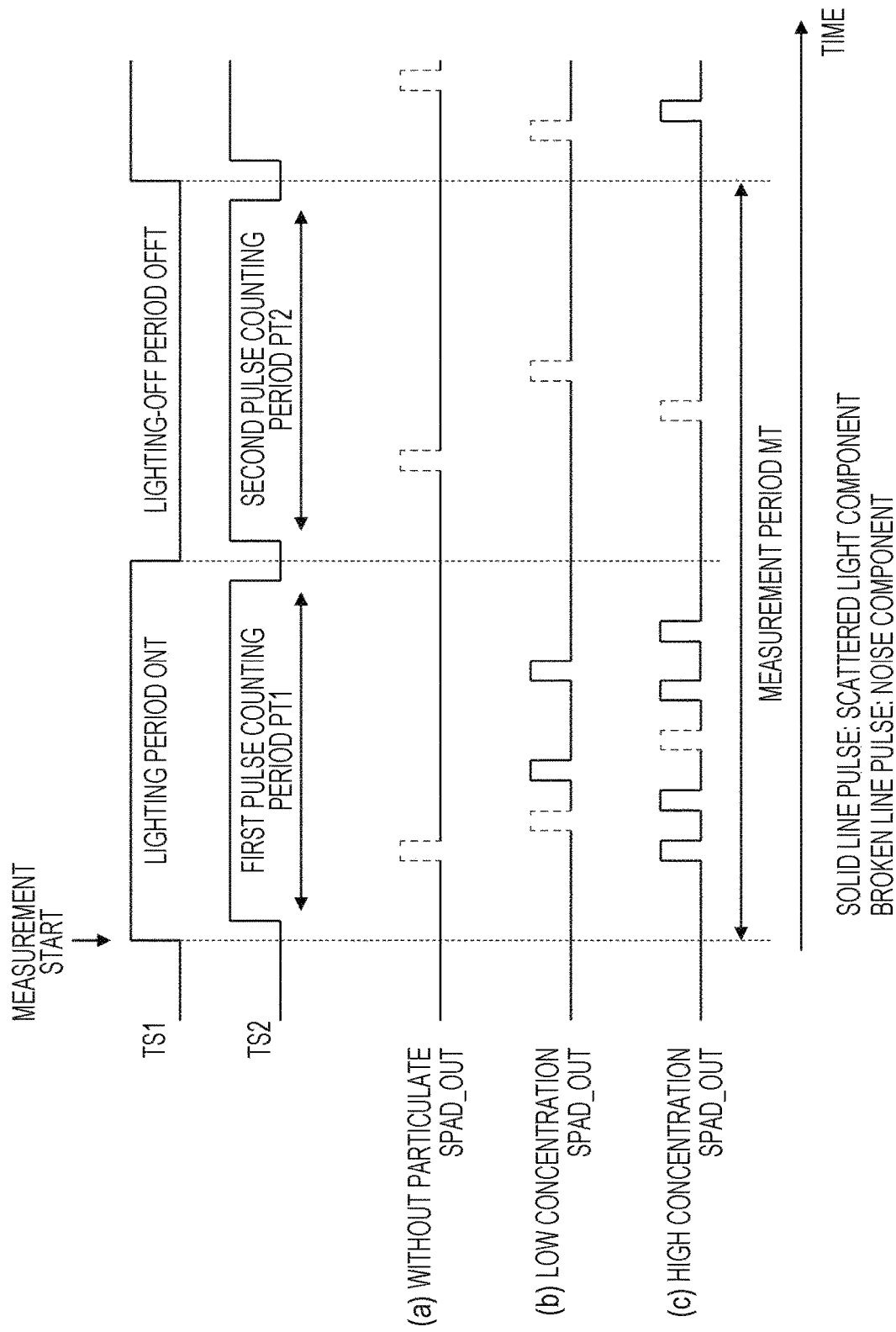

FLOW OF PARTICULATES

PARTICULATE DETECTION SENSOR, DUST SENSOR, AIR CONDITIONING DEVICE, AND CONTROL METHOD OF PARTICULATE DETECTION SENSOR

BACKGROUND

1. Field

The present disclosure relates to a particulate detection sensor that detects concentration of particulates included in a fluid, and a dust sensor and an air conditioning device using the same.

2. Description of the Related Art

With the progress of the scientific technology, air pollution becomes a problem. Regarding this, for example, Japanese Unexamined Patent Application Publication No. 2000-356583 (published on Dec. 26, 2000) proposes a dust sensor that detects concentration of particulates such as soot, tobacco smoke particles, air pollutants, or particulates such as house dust and detects an air pollution status. Particulates such as soot, tobacco smoke particles, air pollutants, and particulates such as house dust which float in an air as described above are collectively referred to as "dust" below.

In particular, in recent years, hazard in that a particulate substance represented by PM 2.5 (particle size is equal to or smaller than 2.5 µm) causes health damage has been pointed out. Therefore, a particulate detection sensor or a dust sensor capable of detecting concentration of particulates having a particle size of 2.5 µm or less with high accuracy is desired.

Here, the concentration of particulates refers to mass concentration, number concentration, or the like of particulates included in a fluid being a gas or a liquid. The mass concentration represents the total mass of particulates in a fluid in a unit volume, and the unit of the mass concentration is expressed by [µg/m$^3$] or the like. The number concentration represents the number of particulates in a fluid in a unit volume, and the unit of the number concentration is expressed by [1/m$^3$] or the like. The particulate described in this specification means a particulate having a particle size in a range of about 0.1 µm to several tens of µm.

Such a particulate detection sensor or a dust sensor is mounted, for example, in an air conditioning device such as an air purifier that automatically operates or an air conditioner with an air purifying function. Contamination of an air is detected by the above sensor, and an air volume adjustment or an operation control of the air conditioning device is performed in accordance with the degree of contamination.

FIG. 17 illustrates an example of a circuit configuration of a dust sensor 500 in the related art. As illustrated in FIG. 17, the dust sensor 500 includes a light emitting element (for example, an LED) 501 that projects light to a detection area 503 and a light detecting element (for example, photodiode) 505 that receives light 504 scattered by dust particles in the detection area 503. Further, the dust sensor 500 includes a driving circuit 510 that drives the light emitting element 501, an IV conversion circuit 506 that converts a received light current in the light detecting element 505 into a voltage signal, a plural-stages amplifier circuit 508 that amplifies the voltage signal, a high-pass filter HPF 507 that is used for removing low-frequency noise and includes a resistor and a capacitor, and a variable resistor R509 that adjusts an amplification factor of the amplifier circuit.

FIGS. 18A and 18B illustrate examples of an operation waveform of the dust sensor 500. A horizontal axis in FIGS. 18A and 18B indicates a time change. FIG. 18A illustrates a waveform of a driving signal (pulse signal) of the light emitting element 501 and illustrates that the light emitting element 501 lights at an H level, and the light emitting element 501 lights-off at an L level. FIG. 18B illustrates a waveform of an output signal. If the light emitting element 501 turns on, scattered light 504 from dust particles is incident to the light detecting element 505. Thus, a pulse signal in synchronization with a timing at which the light emitting element 501 turns on is obtained in the output signal.

The intensity (light quantity) of the scattered light 504 changes depending on the concentration of dust particles. Thus, the amplitude of the pulse signal changes depending on the concentration of dust. (b1), (b2), and (b3) in FIG. 18B illustrate such a form. For example, the concentration of dust particles becomes high, and thus the received quantity of scattered light increases. Accordingly, the amplitude of the pulse signal also increases as the concentration becomes higher. Thus, it is possible to detect the concentration of dust particles by measuring a peak voltage value of the pulse signal.

However, the output signal illustrated in FIG. 18B includes a noise component such as shot noise or thermal noise, which is generated by the light detecting element 505 or the amplifier circuit 508 or a noise component such as disturbance light noise or electromagnetic noise, in addition to the pulse signal by the scattered light 504. Therefore, the noise components are included in the measurement value of the peak voltage in the pulse signal.

FIG. 19 illustrates dependency of the measurement value of the peak voltage in the pulse signal on dust concentration. The measured peak voltage value fluctuates depending on the dust concentration, and thus it is possible to detect the dust concentration from the measurement value of the peak voltage. Here, the measurement value when the concentration of dust particles is zero (there is no dust) is obtained in accordance with the noise component.

If the dust concentration is reduced, the quantity of the scattered light from the dust particles is reduced. Thus, a signal component (peak voltage) of the scattered light 504 is decreased, and as a result, the scattered light component is buried in the noise component. Therefore, if the concentration of dust particles is reduced, measurement accuracy of the dust concentration is lowered, and a range in which measurement of concentration is not possible is generated in a low-concentration area. For example, a case where the noise component fluctuates by the change of the operation condition of the sensor such as a change of an ambient temperature also has an influence on the measurement accuracy of the dust concentration.

Further, generally, it is known that the intensity of the scattered light from particulates is proportional to six power of the particle size. As the particle size of dust particles becomes smaller, the measurement value of the peak voltage, which is measured by the dust sensor 500 is reduced. Similar to measurement at low concentration in FIG. 19, the peak voltage value of the scattered light component is buried in the noise component. Thus, as the particle size of the dust particles becomes smaller, the measurement accuracy of the dust concentration is lowered.

In the related art, an avalanche photodiode (APD) using an avalanche amplification (avalanche) effect of the photodiode is used as a light detecting element for detecting weak light, in fields of optical communication and distance measuring sensors. The avalanche photodiode operates in a linear mode when a reverse bias voltage smaller than a breakdown voltage is applied, and an output current fluctuates to have a positive correlation with the received light quantity. The avalanche photodiode operates in a Geiger mode when a reverse bias voltage which is equal to or greater than the breakdown voltage is applied. The avalanche photodiode in the Geiger mode causes avalanche multiplication (avalanche amplification) even when a single photon is incident, and thus a large quantity of output current may be obtained. Therefore, the avalanche photodiode in the Geiger mode is referred to as a single photon avalanche diode (SPAD).

It is possible to further improve light detection efficiency by arranging a plurality of SPADs in an array. The light detection efficiency of a SPAD array is defined by a product of an aperture ratio (ratio of a light detectable area in the entirety of a SPAD array light detecting unit), quantum efficiency (probability of light incident to the SPAD generating carriers), and an avalanche multiplication factor (probability of the generated carriers causing avalanche multiplication).

It is possible to obtain a pulse signal output (digital signal) synchronized with photon incidence, by adding an active quenching resistor in series to the avalanche photodiode in the Geiger mode. FIG. 20A is a diagram illustrating an example of a circuit configuration in which the active quenching resistor is added in series to the avalanche photodiode in the Geiger mode. The circuit illustrated in FIG. 20A includes an avalanche photodiode APD 600, an active quenching resistor R600 (resistance component of an NMOS transistor (n-type metal oxide semiconductor field effect transistor)), and a buffer BUF600.

The avalanche photodiode APD 600 (referred to as the APD 600 below) is an avalanche photodiode in the Geiger mode. If a reverse bias voltage VHV600 which is equal to or greater than a breakdown voltage is applied to the APD 600, avalanche multiplication is caused by light incidence, and thus a current flows. If the current flows in the active quenching resistor R600 (referred to as the resistor R600 below) connected in series to the APD 600, a voltage between terminals of the resistor R600 increases. Thus, the reverse bias voltage VHV600 of the APD 600 decreases, and avalanche multiplication is stopped.

If there is no current caused by avalanche multiplication, the voltage between terminals of the resistor R600 decreases, and the APD 600 turns into a state where the reverse bias voltage VHV600 which is equal to or greater than the breakdown voltage is applied, again. The change of the voltage at a node A600 between the APD 600 and the resistor R600 is output through the buffer BUF600. Thus, a pulse signal digitized in synchronization with photon incidence is output from the buffer BUF600. The output pulse signal may be a binary pulse signal. FIG. 20B illustrates an operation waveform of the circuit in FIG. 20A. Japanese Unexamined Patent Application Publication No. 2012-60012 (published on Mar. 22, 2012) discloses the diagram illustrated in FIG. 20B.

Japanese Unexamined Patent Application Publication No. 7-92075 (published on Apr. 7, 1995) discloses a particulate detection circuit in which an avalanche photodiode in the Geiger mode is used as a light detecting element in order to detect weak scattered light from fine particles. The particulate detection circuit disclosed in Japanese Unexamined Patent Application Publication No. 7-92075 (published on Apr. 7, 1995) includes two current-voltage conversion circuits being a current-voltage conversion circuit that measures scattered light from fine particles and a current-voltage conversion circuit that measures scattered light from particles having a large particle size. Thus, a large input dynamic range is obtained for scattered light received by the avalanche photodiode, and it is possible to perform detection of particulates to relatively large particles by one light detecting circuit.

However, the above-described technologies in the related art have problems as follows. That is, in a case of the circuit configuration disclosed in Japanese Unexamined Patent Application Publication No. 2000-356583 (published on Dec. 26, 2000), as described above, the scattered light component from dust particles and the noise component are mixed in the output signal. Thus, in the method of measuring the peak voltage value, it is not possible to distinguish the scattered light component from the noise component. Therefore, a possibility that, if the dust concentration decreases or the dust particle size is reduced, the measurement accuracy is lowered, or the range in which the measurement of concentration is not possible is generated is high.

In particular, as the ambient temperature becomes higher, the shot noise of the light detecting element or the thermal noise of a circuit element increases, and the noise component appearing in the output signal increases. Therefore, when the ambient temperature is high, a possibility that detection accuracy of the dust concentration is largely lowered, or measurement of the dust concentration is not possible by increasing the noise component is high.

In the circuit configuration disclosed in Japanese Unexamined Patent Application Publication No. 2000-356583 (published on Dec. 26, 2000), an amplifier having a high gain is formed using a plurality of amplifier circuits in order to detect the weak scattered light from dust particles. Thus, there is a concern that tolerance to the electromagnetic noise and the disturbance light noise is deteriorated. This is because a metal wire connecting circuit elements functions as an antenna, and the electromagnetic noise is coupled to the wire, and thus noise is superimposed on a signal wire, and the noise is amplified by the amplifier.

In particular, as measures for tolerance deterioration by the electromagnetic noise, it is desirable to suppress an influence of the electromagnetic noise. As the measures, a method in which the entirety of the dust sensor is covered by a metal shield case, or a method in which conductive resin is used for a sensor housing case, and the electromagnetic noise is shielded by grounding the conductive resin may be provided. Measures, for example, of removing noise with a high-pass filter are also desirable on the circuit. Thus, there is a concern that cost for the sensor increases by increasing the number of components which includes the plurality of amplifier circuits and constitute the sensor.

In the particulate detection circuit disclosed in Japanese Unexamined Patent Application Publication No. 7-92075 (published on Apr. 7, 1995), a plurality of power source voltages are desired, or it is desirable to apply a bias voltage of 100 V or greater to the avalanche photodiode. Thus, it is not suitable for the particulate detection circuit to be mounted in a household air conditioning device such as an air purifier. Since an operation voltage varies for each current-voltage conversion circuit, an insulating amplifier configured with a photocoupler and the like is desired, and there is a concern about cost increase by an increase in the number of components.

Further, in Japanese Unexamined Patent Application Publication No. 7-92075 (published on Apr. 7, 1995), unit for increasing an S/N ratio (signal to noise ratio) by suppressing the noise component such as the thermal noise in a manner of setting the value of a feedback resistor Rf in the IV conversion circuit to an optimum value is described. However, a specific method of distinguishing the scattered light component from the noise component and performing removal is not disclosed. Therefore, there is a concern that the measurement accuracy is lowered in measurement at low concentration or measurement of fine particles.

It is desirable to realize a particulate detection sensor in which it is possible to detect particulate concentration with high accuracy, to suppress the decrease of the measurement accuracy by the change of the ambient temperature, disturbance light noise, electromagnetic noise, manufacturing variations, and the like, and to suppress an increase in cost of the sensor by reducing the number of components constituting the sensor.

SUMMARY

To solve the above problems, according to an embodiment of the present disclosure, a particulate detection sensor detects concentration of a particulate in a fluid. The particulate detection sensor includes a light emitting element that projects light to the particulate, a SPAD array light detecting unit that includes a plurality of single photon avalanche diodes (SPADs), receives light projected from the light emitting element and scattered by the particulate, and outputs a pulse signal, the single photon avalanche diodes being arranged in an array and operating in a Geiger mode, and a signal processing unit that calculates the concentration of the particulate based on a pulse count value being a value obtained by counting the pulse signal. The signal processing unit calculates the concentration of the particulate based on a first pulse count value and a second pulse count value, the first pulse count value being a pulse count value of the pulse signal in a lighting period in which the light emitting element projects the light, the second pulse count value being a pulse count value of the pulse signal in a lighting-off period in which the light emitting element does not project the light.

According to another embodiment of the present disclosure, a dust sensor includes the particulate detection sensor having the above-described configuration. The dust sensor has a detection area for detecting a dust particulate floating in a gas and detects concentration of the dust particulate.

According to still another embodiment of the present disclosure, there is provided an air conditioning device including the dust sensor having the above-described configuration.

According to still yet another embodiment of the present disclosure, there is provided a control method of a particulate detection sensor that detects concentration of a particulate in a fluid. The control method includes projecting light to the particulate by a light emitting element, receiving light projected from the light emitting element and scattered by the particulate, and outputting a pulse signal, by a SPAD array light detecting unit including a plurality of SPADs which are arranged in an array and operate in a Geiger mode, and calculating the concentration of the particulate based on a pulse count value being a value obtained by counting the pulse signal, by a signal processing unit. In the calculating of the concentration of the particulate, the concentration of the particulate is calculated based on a first pulse count value and a second pulse count value, the first pulse count value being a pulse count value of the pulse signal in a lighting period in which the light emitting element projects the light, the second pulse count value being a pulse count value of the pulse signal in a lighting-off period in which the light emitting element does not project the light.

BRIEF DESCRIPTION OF THE DRAWINGS

FIG. 3 is a diagram illustrating an example of the configuration of the SPAD array light detecting unit;

FIG. 4 is a diagram illustrating an example of an operation waveform of the particulate detection sensor;

FIG. 15A is a view when the dust sensor is viewed from the top, and FIG. 15B is a sectional view taken along XVB-XVB in FIG. 15A;

FIG. 18A illustrates a waveform of a driving signal (pulse signal) of a light emitting element, and FIG. 18B illustrates a waveform of an output signal;

DESCRIPTION OF THE EMBODIMENTS

Hereinafter, embodiments of the present disclosure will be described in detail. For easy description, members having the same function as those described in the embodiments are denoted by the same reference signs, and descriptions thereof will be appropriately omitted. The present disclosure relates to a particulate detection sensor that detects concentration of a particulate in a fluid such as a gas or a liquid. A particulate having a particle size which is about 0.1 μm to several tens of μm is set as a detection target.

Embodiment 1

Figure 1:
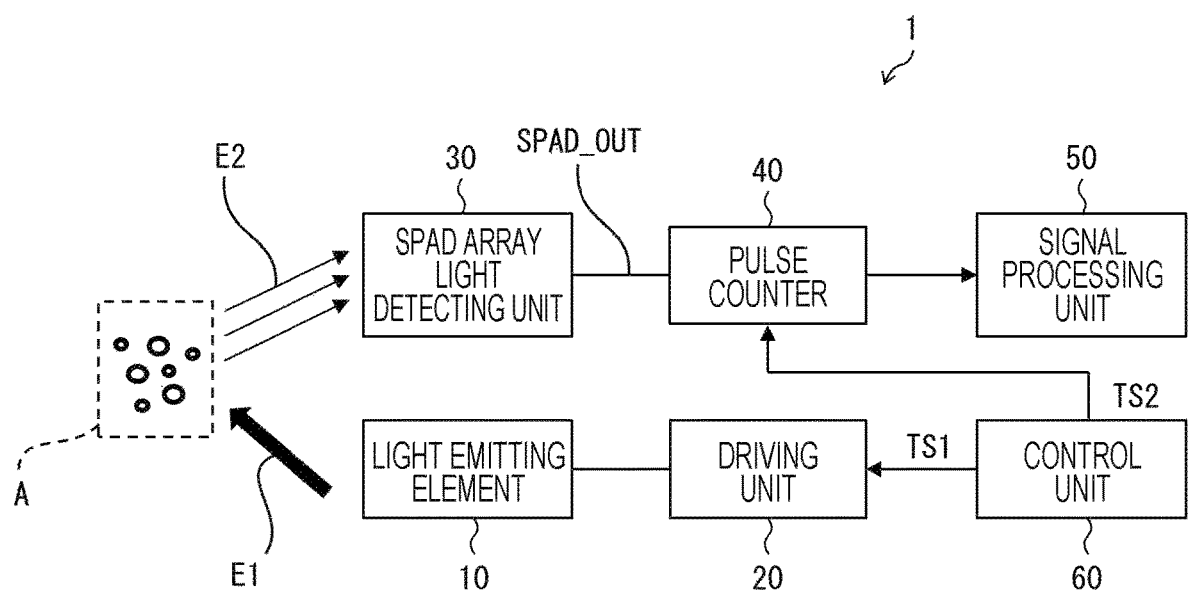
FIG. 1 is a block diagram illustrating an example of an overall configuration of a particulate detection sensor according to Embodiment 1 of the present disclosure.

FIG. 1 is a block diagram illustrating an example of an overall configuration of a particulate detection sensor 1 according to Embodiment 1 of the present disclosure. The particulate detection sensor 1 includes a light emitting element 10, a driving unit 20, a SPAD array light detecting unit 30, a pulse counter 40, a signal processing unit 50, and a control unit 60.

The light emitting element 10 projects projection light E1 to particulates as a detection target. It is assumed that a light emitting diode (LED), a laser diode (LD), or the like is used as the light emitting element 10. However, the embodiment is not limited thereto. In addition, an organic electroluminescence (organic EL) element, a vertical cavity surface emitting laser (VCSEL), or the like may be used as the light emitting element 10.

The driving unit 20 drives the light emitting element 10. The SPAD array light detecting unit 30 is configured by a SPAD array in which a plurality of SPADs operating in a Geiger mode are arranged in an array. The SPAD array is used for receiving scattered light E2 from the particulates. The pulse counter 40 counts a binary pulse signal which is output from the SPAD array light detecting unit 30 and is digitized. The signal processing unit 50 performs data storing or calculation of a counting value of a pulse count (referred to as a pulse count value below). The control unit 60 controls the signal processing unit 50, and a driving period of the light emitting element 10 and a pulse counting period of the pulse counter 40.

Figure 2A:
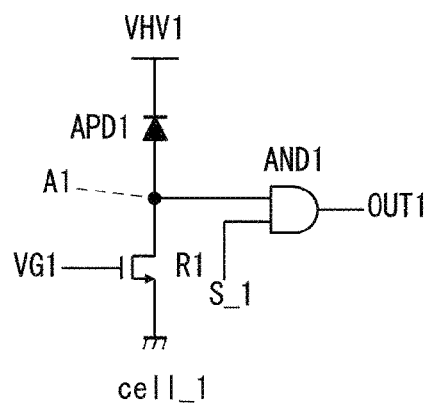
FIG. 2A is a schematic diagram illustrating an example of a circuit configuration of a SPAD cell constituting a SPAD array light detecting unit in the particulate detection sensor.

FIGS. 2A to 2D illustrate configuration examples of the SPAD array light detecting unit 30 and examples of an operation waveform thereof. FIG. 2A is a schematic diagram illustrating an example of a circuit configuration of a SPAD cell cell_1 (SPAD cell) constituting the SPAD array light detecting unit 30 in the particulate detection sensor 1. In the SPAD cell cell_1, an active quenching resistor R1 (NMOS, ON resistor) (referred to as the resistor R1 below) is connected to the anode side (node A1 side) of an avalanche photodiode APD1 (referred to as APD1 below). The SPAD cell cell_1 is configured to output a pulse signal which is digitized with respect to light incident to APD1, through an AND circuit AND1.

A selection signal S_1 is connected to another input of the AND circuit AND1, and validity or invalidity of the SPAD cell cell_1 may be selected in accordance with an H/L level of the selection signal S_1. When the selection of the SPAD cell cell_1 is not desired, the selection signal S_1 may be fixed to the H level. A reverse bias voltage VHV1 which is equal to or greater than a breakdown voltage of APD1 is applied to a cathode side of APD1, and thus APD1 operates in the Geiger mode.

Figure 2B:
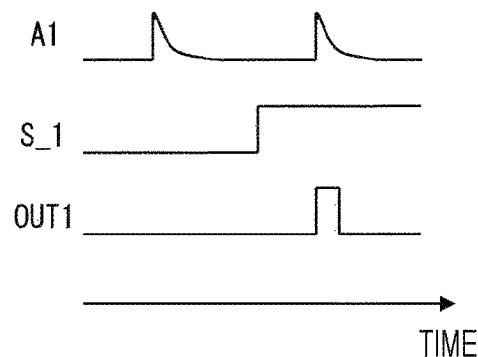
FIG. 2B is a diagram illustrating an example of an operation waveform of the SPAD cell.

FIG. 2B is a diagram illustrating an example of an operation waveform of the SPAD cell cell_1. As described in the section of "Background Art", if the projection light E1 is incident to APD1 operating in the Geiger mode, carriers generated by light incidence cause avalanche multiplication, and a current is formed. Thus, a current flows in the resistor R1 connected in series to APD1. Thus, a voltage between terminals of the resistor R1 increases, the reverse bias voltage VHV1 of APD1 decreases, and avalanche multiplication is stopped.

If there is no current caused by avalanche multiplication, the voltage between terminals of the resistor R1 decreases, and APD1 turns into a state where the reverse bias voltage VHV1 which is equal to or greater than the breakdown voltage is applied, again. A waveform showing this form is a waveform at the node A1 illustrated in FIG. 2B. If a large current is generated by avalanche multiplication, a voltage value at the node A1 rises rapidly. After avalanche multiplication is stopped, the voltage value at the node A1 falls slowly. The time desired from a rising edge to a falling edge at the node A1 is called as a dead time. In this period, even if new projection light E1 is incident to the SPAD cell cell_1, avalanche multiplication does not occur.

The dead time depends on circuit parameters and may be set to be equal to or shorter than about 100 ns. If the selection signal S_1 to be input to the AND circuit AND1 is set to H, and the waveform at the node A1 is output through the AND circuit AND1, a pulse signal as represented by OUT1 in FIG. 2B is obtained. Thus, in signal processing, it is possible to convert an analog current pulse signal generated in APD1 by incidence of the projection light E1, into a digitized binary pulse signal without requiring circuits such as an amplifier circuit and a high-pass filter. As a result, in signal processing, circuits such as the amplifier circuit and the high-pass filter are not desired, and thus it is possible to form a light detecting unit in which the number of components is reduced, and light detection efficiency and the S/N ratio are high.

Figure 2C:
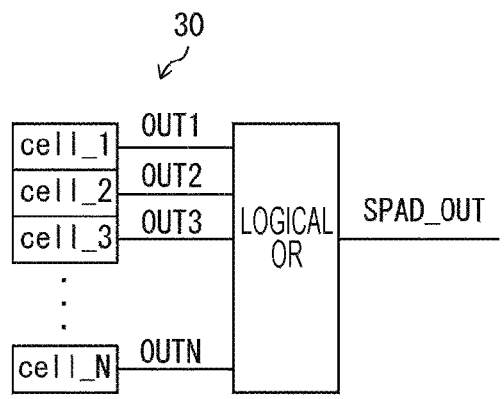
FIG. 2C is a diagram illustrating an example of a configuration of the SPAD array light detecting unit.
Figure 2D:
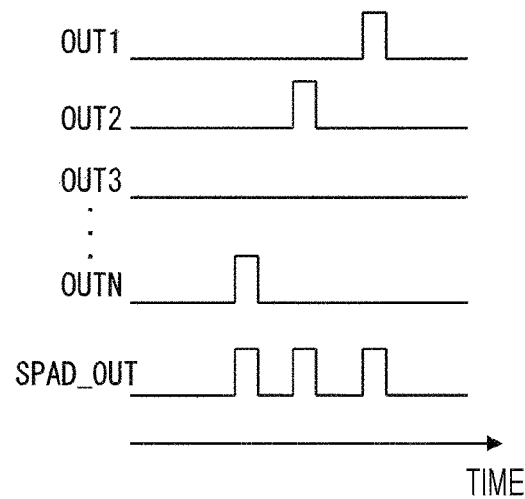
FIG. 2D is a diagram illustrating an output of SPAD_OUT.

FIG. 2C is a diagram illustrating an example of the configuration of the SPAD array light detecting unit 30. The SPAD array light detecting unit 30 has a configuration in which outputs of a plurality (N pieces) of SPAD cells cell_1 to cell_N are connected to a logical OR circuit. A result of logical OR of an output signal OUT1 to an output signal OUTN being output signals of the SPAD cell cell_1 to the SPAD cell cell_N is output as an output signal SPAD_OUT of the SPAD array light detecting unit 30. FIG. 2D is a diagram illustrating the output of the output signal SPAD_OUT. As described above, since the SPAD array light detecting unit 30 is configured to take logical OR of the outputs of the plurality of SPAD cells cell_1 to cell_N, it is possible to further improve the light detection efficiency in the SPAD array in which a plurality of SPAD cells cell are arranged in an array (in a matrix), in comparison to a case where the light detecting element is configured by one SPAD cell cell.

FIG. 3 is a diagram illustrating an example of the configuration of the SPAD array light detecting unit 30. In FIG. 3, numbered areas indicate the SPAD cell cell_1 to the SPAD cell cell_N illustrated in FIG. 2A, respectively. The plurality of SPAD cells cell are arranged in an array. As described above, since the plurality of SPAD cells cell are arranged in an array, the light detecting area of the light detecting element is wider than that in a case where the light detecting element is configured by one SPAD cell cell. As a result, the viewing angle of the light detecting element is widened, and the light detection efficiency is improved. FIG. 3 illustrates the SPAD array including total 100 cells of 10 cells×10 cells. However, the SPAD array light detecting unit 30 according to the present disclosure is not limited to the above number of cells.

Regarding the output of the SPAD array light detecting unit 30, logical OR of the outputs of the SPAD cells cell is performed. Thus, for example, even when pulse signals are simultaneously output from two SPAD cells cell, only one pulse signal is output as the output of the SPAD array light detecting unit 30.

When multiple SPAD cells cell are provided, or when the light quantity of light received by the SPAD array light detecting unit 30 is large, as described above, a frequency that the SPAD cells cell simultaneously output the pulse signal is high. Therefore, as the number of SPAD cells cell increases, or as the received light quantity of the SPAD array light detecting unit 30 becomes larger, linearity of the number of output pulses of the SPAD array light detecting unit 30 to an incident light quantity is decreased. As described above, it is possible to set the light detection efficiency to be high, by setting the number of SPAD cells cell to be large. However, the linearity of the number of output pulses to the light quantity of light received by the SPAD array light detecting unit 30 is decreased. Therefore, in the SPAD array light detecting unit 30, it is desirable to set the optimum number of SPAD cells cell in accordance with performance or the use purpose desired for the particulate detection sensor 1.

Operation of Particulate Detection Sensor

FIG. 4 is a diagram illustrating an example of an operation waveform of the particulate detection sensor 1. A first control signal TS1 is a driving signal for controlling driving of the light emitting element 10. The first control signal TS1 is output from the control unit 60 in FIG. 1. FIG. 4 illustrates that the driving unit 20 causes the light emitting element 10 to light when the first control signal TS1 has an H level, and causes the light emitting element 10 to light-off when the first control signal TS1 has an L level. FIG. 4 illustrate an operation waveform in a case where lighting and lighting-off of the light emitting element 10 are repeated at 50% (Duty ratio of 50%) of a measurement cycle, as an example. The Duty ratio is not limited to 50%.

A second control signal TS2 is a signal for controlling a period in which the pulse counter 40 performs pulse counting. The second control signal TS2 represents a period in which pulse counting is performed on an output pulse signal of the SPAD array light detecting unit 30 and is output from the control unit 60. The second control signal TS2 is set in synchronization with each of a lighting period ONT and a lighting-off period OFFT of the light emitting element 10. The pulse counter 40 performs pulse counting on the output signal SPAD_OUT of the SPAD array light detecting unit 30 during a period in which the second control signal TS2 is at the H level.

Here, a pulse counting period synchronized with the lighting period ONT is set to a first pulse counting period PT1, and a pulse counting period synchronized with the lighting-off period OFFT is set to a second pulse counting period PT2. Pulse count values obtained by counting in the first pulse counting period PT1 and the second pulse counting period PT2 are set to a first pulse count value PC1 and a second pulse count value PC2, respectively. As illustrated in FIG. 4, the combination of the lighting period ONT and the lighting-off period OFFT which are consecutive to each other is set to a measurement period MT (one measurement), and this measurement (one set of one lighting period ONT and one lighting-off period OFF) is continuously repeated.

In the example of the operation waveform in FIG. 4, it is illustrated that each pulse counting period is shorter than the driving period (lighting period ONT or lighting-off period OFFT) of the light emitting element 10. However, each pulse counting period may also be exactly set to a period equal to the driving period. Each pulse counting period may be also set to be much shorter than the driving period. Setting conditions for the pulse counting periods and the driving period may be any conditions so long as "driving period ≥pulse counting period" is satisfied. However, it is desirable to pay attention not to set the driving period to be shorter than the pulse counting period or not to set one pulse counting period across the lighting period ONT and the lighting-off period OFFT.

In (a) to (c) of FIG. 4, the waveform of the output signal SPAD_OUT represents a waveform (output waveform) of the output signal SPAD_OUT of the SPAD array light detecting unit 30 at different particulate concentrations. Specifically, (a) of FIG. 4 illustrates the waveform of the output signal SPAD_OUT when there is no particulate. (b) of FIG. 4 illustrates the waveform of the output signal SPAD_OUT when the particulate is provided at low concentration. (c) of FIG. 4 illustrates the waveform of the output signal SPAD_OUT when the particulate is provided at high concentration.

A pulse signal of a solid line illustrated in the waveform of the output signal SPAD_OUT represents a pulse signal of a scattered light component, which is generated in a manner that projection light E1 projected from the light emitting element 10 is scattered by particulates, and scattered light E2 is received by the SPAD array light detecting unit 30. The light quantity (scattered light quantity) of light scattered by the particulates fluctuates depending on concentration (or the number) of the particulates. Thus, as a result, the number of pulse signals of the scattered light component fluctuates depending on particulate concentration. In other words, if the particulate concentration increases, the number of pulse signals of the scattered light component also increases.

A pulse signal of a broken line illustrated in the waveform of the output signal SPAD_OUT represents a pulse signal of a noise component. As the pulse signal of the noise component, for example, (1) and (2) as follows are included. (1) Pulse signal (called as a dark pulse) generated in a manner that carriers which are thermally generated in an APD (SPAD) operating in the Geiger mode cause avalanche multiplication (2) Pulse signal generated when disturbance light such as sunlight or fluorescent light is incident The carrier described in (1) refers to an electron or a hole which is thermally generated even if light incidence does not occur.

The noise component does not depend on the received quantity of the scattered light. Thus, the noise component may be similarly generated during the lighting period ONT of the light emitting element 10 and during the lighting-off period OFFT. Accordingly, both the number of pulses of the scattered light component and the number of pulses of the noise component are counted in the first pulse count value PC1 during the lighting period ONT. Only the number of pulses of the noise component is counted in the second pulse count value PC2 during the lighting-off period OFFT.

Calculation of Particulate Concentration

Figure 5A:
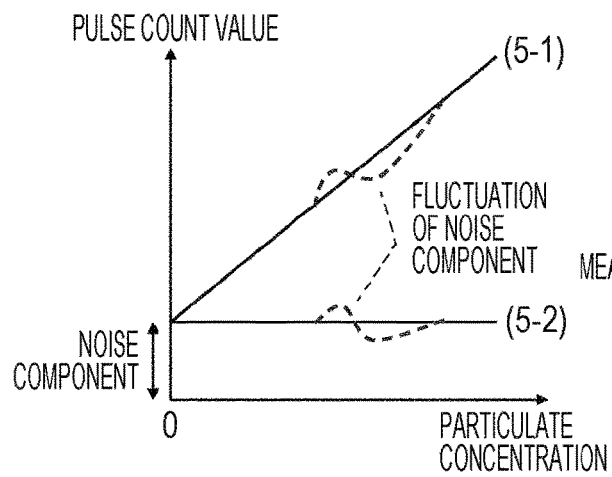
FIG. 5A is a graph illustrating an example of dependency of each pulse count value on particulate concentration.

FIG. 5A is a graph illustrating an example of dependency of each pulse count value on particulate concentration. In a waveform of a solid line in FIG. 5A, (5-1) indicates the first pulse count value PC1 in the lighting period ONT, and (5-2) indicates the second pulse count value PC2 in the lighting-off period OFFT. The second pulse count value PC2 of (5-2) includes only the noise component, and thus has a constant value without depending on the particulate concentration. On the contrary, the first pulse count value PC1 of (5-1) includes both the scattered light component and the noise component, and thus becomes a superimposition (sum) of the scattered light component that fluctuates depending on the particulate concentration and the noise component that does not depend on the particulate concentration. In FIG. 5A, an intercept means the pulse count value of the noise component.

Here, in FIG. 5A, the solid line indicates a case where the noise component does not fluctuate, and a broken-line portion indicates fluctuation or variation of the noise component. The fluctuation of the noise component, which is indicated by the broken line portion occurs, for example, when the ambient temperature T around the SPAD array light detecting unit 30 changes or when the incident light quantity of the disturbance light noise changes. The noise component is not limited to fluctuation having a wave type as illustrated in the broken line portion in FIG. 5A. The broken line portion in FIG. 5A means that, if a measurement environment such as the ambient temperature T changes for each measurement, the count value of the noise component increases and decreases.

In a case where the noise component fluctuates relatively slowly and hardly change during one measurement period MT (one lighting+one lighting-off), the value of the noise component included in the first pulse count value PC1 and the value of the noise component included in the second pulse count value PC2 in one certain measurement are almost equal. In this case, only the pulse count value of the scattered light component remains in a third pulse count value PC3 obtained by subtracting the second pulse count value PC2 from the first pulse count value PC1. Therefore, with the subtraction processing, the third pulse count value PC3 which is not influenced by the fluctuation of the noise component and is only for the scattered light component is obtained.

Figure 5B:
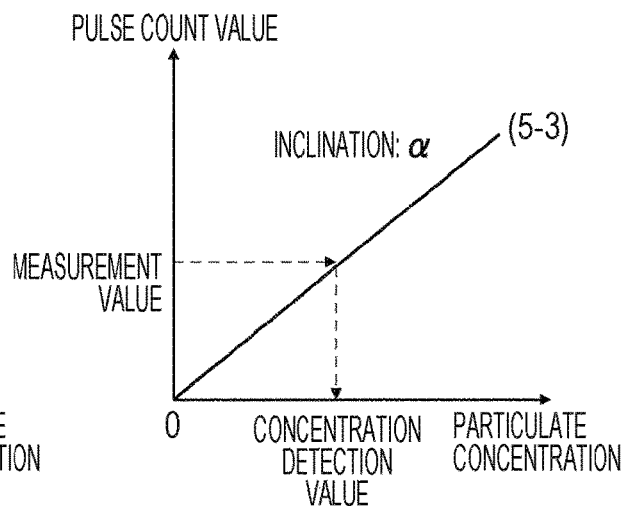
FIG. 5B is a graph illustrating an example of dependency of a third pulse count value on the particulate concentration.

FIG. 5B is a graph illustrating an example of dependency of the third pulse count value PC3 on the particulate concentration. The influence of the fluctuation of the noise component does not appear in the third pulse count value PC3 of (5-3). Therefore, it is possible to detect the particulate concentration by calculation of the signal processing unit 50 with the third pulse count value PC3 measured at certain particulate concentration and a first calculation coefficient x1 (described later) which is preset for calculating the particulate concentration.

Here, the first pulse count value PC1 is set to PC1, the second pulse count value PC2 is set to PC2, the third pulse count value PC3 is set to PC3, the particulate concentration is set to D, and the inclination with respect to the particulate concentration is set to α. In addition, the count values of the noise component in the first pulse count value PC1 and the second pulse count value PC2 are set to N1 and N2. As described above, since N1 is equal to N2, the calculation processing can be represented by the following expression. As with (Expression 1-d) as follows, the particulate concentration D can be calculated by dividing the first pulse count value PC1 and the second pulse count value PC2, or the third pulse count value PC3 by the inclination α. In this case, the first calculation coefficient x1 is the inclination α.

$$PC1 = \alpha \times D + N1 \quad \text{(Expression 1-a)}$$

$$PC2 = N2 \quad \text{(Expression 1-b)}$$

$$PC3 = PC1 - PC2 = \alpha \times D \quad \text{(Expression 1-c)}$$

$$D = (PC1 - PC2)/\alpha = PC3/\alpha \quad \text{(Expression 1-d)}$$

Strictly, since N1 is approximately equal to N2, D is approximately equal to PC3/α. However, in the above expression, description that N1 is equal to N2 is simply made.

As described above, only when the length of the first pulse counting period PT1 is equal to the length of the second pulse counting period PT2, N1=N2 is established. Therefore, when the first pulse counting period PT1 is set to PT1, and the second pulse counting period PT2 is set to PT2, it is desirable to set the lengths of the pulse counting periods to be equal to each other, that is, set PT1 to be equal to PT2. For example, it is desirable that the first pulse counting period PT1 and the second pulse counting period PT2 are generated with the same clock signal.

When, regarding the pulse counting periods, PT1 is set not to be equal to PT2, N1 is not equal to N2, and thus it is not possible to use the calculation expression of (Expression 1-c) itself. However, N1 and N2 indicating the pulse count values of the noise component in the pulse count values are proportional to the first pulse counting period PT1 and the second pulse counting period PT2, respectively. Thus, in the subtraction processing, the second pulse count value PC2 is corrected with a ratio between the first pulse counting period PT1 and the second pulse counting period PT2, and then is subtracted. Thereby, effects similar to those in the above descriptions are obtained. This can be represented by expressions as follows.

$$N2 = N1 \times PT2/PT1 \quad \text{(Expression 2-a)}$$

$$PC1 = \alpha \times D + N1 \quad \text{(Expression 2-b)}$$

$$PC2 = N2 \quad \text{(Expression 2-c)}$$

$$PC3' = PC1 - PC2 \times PT1/PT2 = \alpha \times D \quad \text{(Expression 2-d)}$$

$$D = (PC1 - PC2 \times PT1/PT2)/\alpha \quad \text{(Expression 2-e)}$$

Here, PC3 is not equal to PC3'. The expressions show that, even when the time length of the first pulse counting period PT1 is different from the time length of the second pulse counting period PT2, it is possible to detect the particulate concentration by calculation with PT1, PT2, α, and the first pulse count value PC1 and the second pulse count value PC2 which are measured.

In this case, as the first calculation coefficient x1, three of the first pulse counting period PT1, the second pulse counting period PT2, and the inclination α are provided. For example, when the pulse counting periods are set to satisfy PT1>PT2, if the second pulse counting period PT2 is set to be relatively long, it is possible to reduce a measurement time without decreasing the detection accuracy of the scattered light component. As a result, it is possible to set a response time of the particulate detection sensor 1 to be short. The second pulse counting period PT2 can be set to be equal to or longer than 20 ms, for example. Details will be described later.

Relation between Pulse Counting Period and Measurement Accuracy

A relation between the pulse counting period and the measurement accuracy (measurement error) will be described below.

Figure 5C:
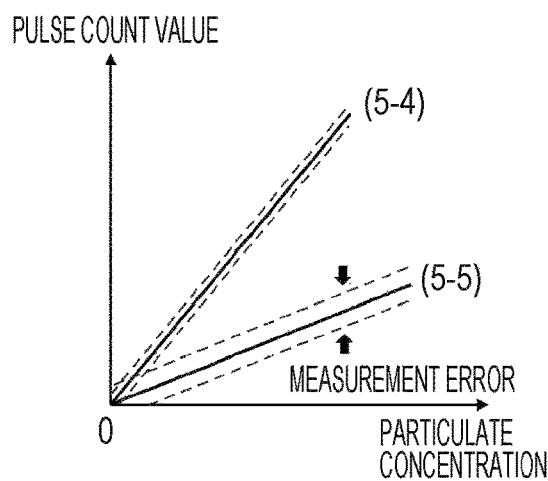
FIG. 5C is a graph illustrating a waveform example of the dependency of the third pulse count value on the particulate concentration.

FIG. 5C is a graph illustrating a waveform example of the dependency of the third pulse count value PC3 on the particulate concentration. (5-4) indicates the third pulse count value PC3 when the pulse counting periods are set to be relatively long. (5-5) indicates the third pulse count value PC3 when the pulse counting periods are set to be relatively short. Here, a portion of the waveform, which is indicated by a solid line represents an average value of the third pulse count value PC3 after the subtraction. A width indicated by a broken line represents the width of the measurement error of the third pulse count value PC3. A value obtained by dividing the width of the measurement error at certain particulate concentration by the average value of the particulate concentration detected by the particulate detection sensor 1 corresponds to "the measurement accuracy" at the particulate concentration. In a case of the waveform example in FIG. 5C, "the measurement accuracy" when the pulse counting periods of (5-4) are set to be relatively long is set to be higher than "the measurement accuracy" when the pulse counting periods of (5-5) are set to be relatively short.

Generally, the pulse count value allowed to be measured by the pulse counter 40 has an upper limit. In measurement of the pulse counter 40, if the particulate concentration is high, the pulse count value increases. When the particulate concentration increases up to certain particulate concentration or greater, the pulse count value reaches the upper limit. Thus, measurement at particulate concentration or greater when the pulse count value reaches the upper limit is not possible. If the particulate concentration until the pulse count value reaches the upper limit is set to "a measurable range", consequently, "the measurable range" is set to be narrow when the pulse counting periods of (5-4) are set to be relatively long. "The measurable range" is set to be wide when the pulse counting periods of (5-5) are set to be relatively short.

In a stable operation condition, that is, in which the noise component does not fluctuate much by temperature variation or the like, generally, if the pulse counting periods are set to be long, it is possible to suppress the measurement error and to set "the measurement accuracy" of the particulate detection sensor to be high. However, as described above, as the pulse counting periods are set to be long, "the measurable range (dynamic range)" is set to be narrower.

Setting of Optimum Pulse Counting Period

As factors of causing the measurement error, various factors as follows are considered: for example, (1) a fundamental measurement error of a SPAD array; (2) variation in temperature or variation in disturbance light noise; (3) influence of commercial power frequency (50 Hz or the like); and (4) variation in probability that particulates are present. The optimum values of the pulse counting periods, which causes the measurement errors of the pulse count values to be the smallest, vary for each of the factors of causing the measurement error. Therefore, it is desirable that each of the pulse counting periods in the particulate detection sensor 1 is set to cause the total measurement error to be the smallest, in consideration of the optimum value (optimum range) for each of the causing factors. An example of setting the optimum values of the pulse counting periods will be described below.

First, when the measurement error factor corresponds to variation in temperature, variation in disturbance light noise, or fluctuation of the noise component at the commercial power frequency (50 Hz or the like), only the pulse count value of the noise component influences the pulse count values. Here, if the noise component fluctuates in one measurement period MT (one lighting+one lighting-off), the count value of the noise component in each of the first pulse count value PC1 during the lighting period ONT and the second pulse count value PC2 during the lighting-off period is deviated. As a result, the third pulse count value PC3 after the subtraction varies for each measurement, and this variation acts as the measurement error.

In order to suppress the measurement error, ideally, the time of each pulse counting period is set as short as possible. However, if each pulse counting period is set shorter than desirable, the number of pulses of the scattered light component or the noise component, which can be measured in one measurement period MT is reduced. Thus, as a result, the third pulse count value PC3 is deviated for each measurement, and the measurement error increases.

When the ambient temperature T changes with time, as the pulse counting periods become shorter, the influence of the fluctuation can be suppressed more. However, if the pulse counting periods are too short, it is not possible to count the pulse signal many times, and the number of times of sampling is reduced. Thus, the fundamental measurement accuracy (sampling accuracy) is decreased.

Further, the pulse counting period is desirably set to cause the measurement error caused by the commercial power frequency to have the minimum value. This is because it is rare that the ambient environment such as the ambient temperature T or disturbance light noise normally varies with a very short period (1 μs or smaller, or the like), and disturbance light from lighting equipment such as a fluorescent lamp or an incandescent lamp often varies at the commercial power supply frequency (50 Hz, or the like). Here, in order to suppress the measurement error by variation caused by the commercial power frequency, it is desirable that the pulse counting periods (or driving period of the light emitting element 10) is set to about 20 ms (50 Hz) or to about an integer multiple of 20 ms. Thus, variations of the first pulse count value PC1 and the second pulse count value PC2 obtained by counting in the first pulse counting period PT1 and the second pulse counting period PT2 are averaged in time. As a result, it is possible to suppress the measurement error of the third pulse count value PC3 after subtraction, which is caused by the commercial power frequency.

In a case where fluctuation or variation of the scattered light component, which is caused by the particulate concentration or the like is considered as the error factor, the pulse counting periods are ideally set to be long. For example, when the concentration of the particulate is low (the number of particulates is small), a case where the first pulse counting period PT1 synchronized with the lighting period ONT is set to be short to about ⅒ of a passing time (period) of one particle, with respect to a time period in which one particulate passes through the detection area is considered. When a period in which pulse counting (measurement) is performed ten times, a frequency that scattered light from particulates can be received in the first pulse counting period PT1 is about one time to two times. In the first pulse counting period PT1 performed the remaining eight to nine times, it is not possible to totally receive the scattered light from the particulates. Therefore, the measurement error for each measurement increases. In order to suppress the measurement error, at least, it is desirable to set the length of the first pulse counting period PT1 to be longer than the time period in which one particulate passes through the detection area.

In a case where fluctuation or variation of the scattered light component, which is caused by the particulate concentration or the like is considered as the error factor, the optimum pulse counting periods are variously set by target performance desired for the particulate detection sensor 1. For example, in a case where it is desirable to set the measurement accuracy of the particulate detection sensor 1 to be high in measurement when the particulate concentration is low, it is desirable to set the first pulse counting period PT1 to be long so as to correspond to the measurement accuracy set to be high. The reason is that, as the particulate concentration set as a target becomes low, the time period in which one particulate passes through the detection area becomes longer. On the contrary, when it is not desirable to set the measurement accuracy to be high at low concentration, it is not desirable to set the first pulse counting period PT1 to be longer than desirable, and the first pulse counting period PT1 may be set to a level at which the measurement accuracy of each pulse count value is not decreased largely, for example, to 20 ms.

As an example of the target performance desired for the particulate detection sensor 1, a case of setting an optimum setting range of the pulse counting period in order to ensure the high measurement accuracy even though the number concentration of particulate is 0.01 pieces/mm3 and low will be described. Here, it is assumed that the size of the detection area of the particulate is a cubic area of 2 mm×2 mm×2 mm, and the particulate moves at a speed of 1 m/s in one direction. In the above case, since the time period in which the one particulate passes through the detection area is set to about 25 ms, the pulse counting periods are desirably set to be equal to or greater than at least 25 ms. In order to suppress the measurement error caused by the commercial power frequency (50 Hz), the pulse counting periods are desirably set to be an integer multiple of 20 ms. Thus, the pulse counting periods are desirably set to about 100 ms, with the greatest common divisor of both.

The setting result of the pulse counting periods is just an example, and setting of the pulse counting periods is not limited to the above setting. As described above, the optimum value of each pulse counting period differs depending on the target performance (desired specification) desired for the particulate detection sensor 1. Thus, the pulse counting periods are desirably set in accordance with target performance such as the measurement accuracy, the measurable range, or tolerance to fluctuation of the operation condition (such as the ambient temperature T).

The waveform in FIG. 5C indicates the third pulse count value PC3 in one measurement period MT. When it is desirable to further reduce (suppress) the measurement error, a plurality of measurements may be performed, and averaging processing of the third pulse count value PC3 in the measurement may be performed. For example, when the first pulse counting period PT1 is the lighting period ONT, and the second pulse counting period PT2 is the lighting-off period OFFT, if the pulse counting periods are set to 100 ms, one measurement period is 200 ms. In this case, it is possible to realize the particulate detection sensor 1 that outputs an average value of five measurement results at an interval of 1 second.

Generally, it is possible to reduce the measurement error to $1/\sqrt{N}$ times by averaging N times. Thus, in this case, it is possible to reduce the measurement error to $1/\sqrt{5}$ times by averaging. When it is desirable to further reduce the measurement error, it is possible to reduce the measurement error by more increasing the average number of times. When the average number of times increases, an output rate (interval of output time) of the particulate detection sensor 1 becomes longer, and the response time becomes slower. Thus, the averaging number of times is desirably set to the optimum averaging number of times in accordance with the target performance (measurement accuracy, response time) desired for the particulate detection sensor 1.

Moving averaging processing is performed on a measurement result of one measurement, and the moving average value is set to an output value of the particulate detection sensor 1. Thus, it is possible to realize the particulate detection sensor 1 in which it is possible to further suppress the measurement error and to average the measurement result.

The moving averaging processing will be described. For example, M times of moving averaging processing refers to processing in which an average value of measurement results including one measurement result (or output result) in one measurement (or output) and (M-1) pieces of the latest (previous) measurement results (or output results) is set as an output result in this measurement (or output). Further, in the moving averaging processing, the processing in which the average value is set to the output result is continuously repeated for each measurement (output).

Since the output of the particulate detection sensor 1 is set to be the moving average value being the average value based on the moving averaging processing, it is possible to increase the averaging number of times without setting the output rate (output interval) to be long. The moving average value is obtained by averaging the latest measurement results ((M-1) pieces). Therefore, for example, even when the measurement result fluctuates suddenly and largely by incidence of sudden noise or instantaneous disturbance light noise, in comparison to the latest (previous) measurement result, the influence of the sudden fluctuation of the measurement result is suppressed by performing the moving averaging processing. As a result, it is possible to suppress an erroneous operation of a device in which the particulate detection sensor 1 is mounted.

Since the output of the moving average value is averaged by the latest measurement results ((M-1) pieces), the response time of the particulate detection sensor 1 becomes slow. It is desirable that the optimum averaging processing or the optimum output method is selected by the performance (measurement accuracy, response time) desired for the particulate detection sensor 1.

Specific descriptions will be made. For example, when the moving averaging processing is further performed ten times on the output value (average value of five measurements) output at an interval of one second, an average of an output value in one time and output values in the previous nine times is set as the output result, and the processing is repeated at an interval of one second. Thus, the output maintains the interval of one second, and the average value of ten times (average value of the total 50 measurements) is output. In a case where the measurement value fluctuates largely from a certain time point, the output values in the previous nine times are averaged, and thus the moving average output value does not fluctuate immediately, but fluctuates slowly. Thus, the influence (erroneous operation or the like) on instantaneous fluctuation of the measurement value by noise and the like is suppressed, but the response time to the fluctuation of the measurement value is delayed.

Effects of Embodiment 1

As described above, in Embodiment 1, the particulate detection sensor 1 has a configuration in which weak scattered light received by the SPAD array light detecting unit 30 is output in a form of a pulse signal obtained as a digital signal, and pulse counting is performed on the pulse signal. Thus, am amplifier circuit having a high gain is not desirable, and it is possible to realize a particulate detection sensor 1 having high accuracy, in which the weak scattered light can be received.

Since the circuit configuration in which an amplifier circuit having a high gain amplifies an analog signal is not provided, it is possible to realize a particulate detection sensor 1 having strong resistance to electromagnetic noise, and to reduce the number of components (materials) as measures for the electromagnetic noise, such as a shield case and a filter. As a result, it is possible to reduce cost for the particulate detection sensor 1.

Further, it is possible to detect the particulate concentration causing an influence of fluctuation or variation of the noise component to be suppressed, by subtracting the second pulse count value PC2 in the lighting-off period OFFT from the first pulse count value PC1 in the lighting period ONT of the light emitting element 10.

Since the pulse counting periods (or driving periods) are set to optimum values, it is possible to realize the particulate detection sensor 1 which can correspond to various kinds of target performance (desired specification), such as the measurement accuracy, the measurable range, and the response time of the particulate detection sensor 1.

As one method of the subtraction processing of each pulse count value in Embodiment 1, a method performed in the signal processing unit 50 in FIG. 1 is considered. In the signal processing unit 50, calculation of the particulate concentration from the pulse count values or the averaging processing is performed together in addition to the subtraction processing. Therefore, the embodiment is not limited to the above-described calculation method. Since the calculating method including the subtraction processing can be flexibly set, it is possible to realize reduction in circuit size or improvement of a response speed, by reducing the number of times of calculation or the like.

Specifically, for example, a method of averaging a plurality of measurement values may be provided in addition to a method in that subtraction of the pulse count value and concentration calculation, which are described in Embodiment 1 as described above are performed for each measurement, the processes are repeated, and finally, averaging is performed to output the value. Specifically, in the method, the moving averaging processing or cumulative processing is performed on each of the first pulse count value PC1 and the second pulse count value PC2, and the pulse count value (measurement result) is updated for each measurement. Finally, subtraction of the averaged (accumulated) pulse count value and concentration calculation are performed only one time to output a concentration detection result.

The former method has a need to store data of a plurality of measurement values output for each measurement. Thus, a data storage circuit such as an SRAM is desired such that the number of data storage circuits is equal to the number of times of measurement. On the contrary, according to the latter method, the pulse count value averaged (accumulated) for each measurement is only updated. Thus, one data storage circuit may be provided, and it is possible to reduce the circuit.

Modification Example

A modification example of Embodiment 1 will be described below. In the modification example, the pulse counter 40 in FIG. 1 is configured by an UP/DOWN counter. That is, the pulse count value is subtracted with the UP/DOWN counter.

In the modification example, the first pulse counting period PT1 in the lighting period ONT is set to an UP counting period (if the pulse signal is counted, the count value increases), and the second pulse counting period PT2 in the lighting-off period OFFT is set to a DOWN counting period (if the pulse signal is counted, the count value decreases). In other words, the UP/DOWN counter counts the pulse signal up in the lighting period ONT and counts the pulse signal down in the lighting-off period OFFT.

Thus, the pulse count value after one measurement is equal to the above-described third pulse count value PC3 obtained by subtracting the second pulse count value PC2 from the first pulse count value PC1. In this case, comparing to the method in which the signal processing unit 50 performs subtraction, the number of pieces of data output from the pulse counter 40 to the signal processing unit 50 can be reduced from two to one. Thus, an effect that it is possible to reduce the circuit element such as a data storage circuit, which is provided in the signal processing unit 50 is obtained. However, the circuit size of the pulse counter 40 increases in comparison to Embodiment 1.

As described above, even though either the subtraction method in Embodiment 1 or the subtraction method in the modification example of Embodiment 1 is used, there is no difference in the final result itself. The optimum subtraction method is desirably selected in consideration of the circuit size, the response speed, the viewpoint of cost, the size, and the like of the particulate detection sensor 1.

Embodiment 2

In Embodiment 2, a temperature correction method with respect to a change of the ambient temperature, a correction method with respect to characteristic deviation by manufacturing variation, and a method of suppressing the measurement error by the stray light component will be described.

Figure 6:
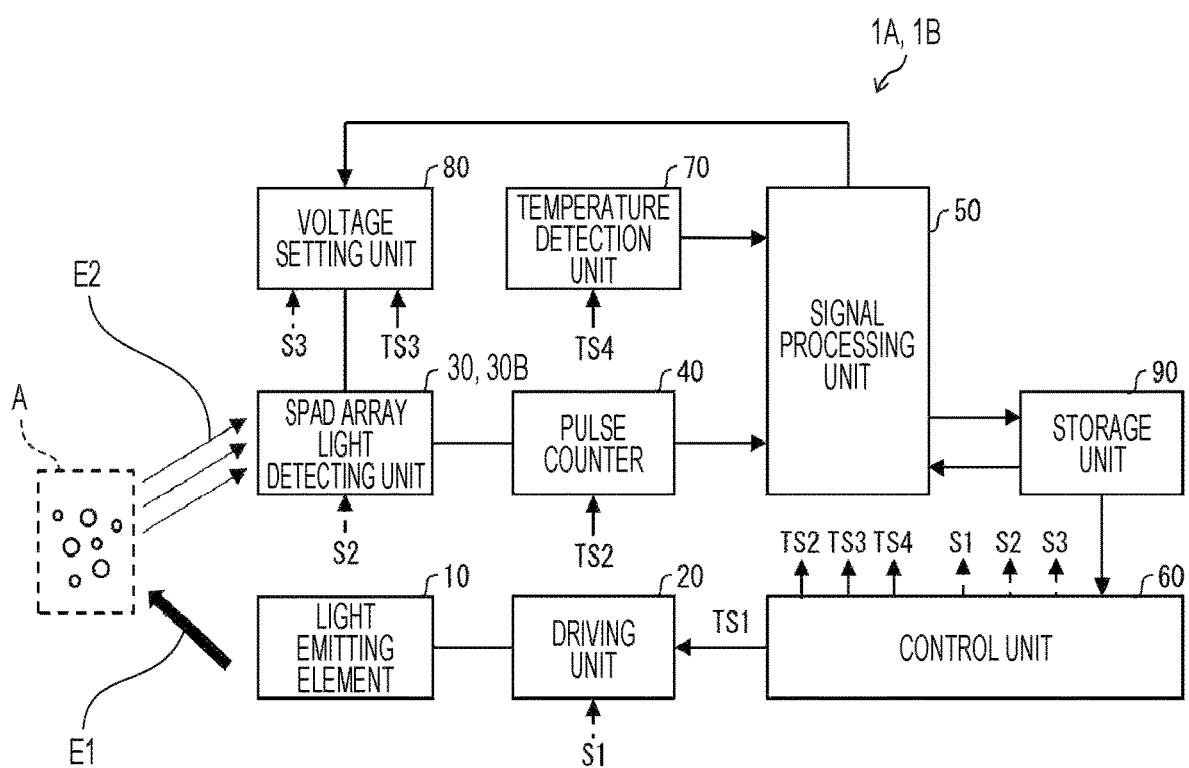
FIG. 6 is a block diagram illustrating an example of an overall configuration of a particulate detection sensor according to Embodiment 2 of the present disclosure.

FIG. 6 is a block diagram illustrating an example of an overall configuration of a particulate detection sensor 1A according to Embodiment 2 of the present disclosure. In Embodiment 2, the particulate detection sensor includes a temperature detection unit 70, a voltage setting unit 80, and a storage unit 90 in addition to the constituent components of the particulate detection sensor 1 in FIG. 1. The temperature detection unit 70 detects the ambient temperature T of the SPAD array light detecting unit 30. The voltage setting unit 80 sets the reverse bias voltage VHV to be supplied to the SPAD array.

The storage unit 90 stores an initial setting value, a calculation coefficient, and the like of each particulate detection sensor 1A. The storage unit 90 is a storage unit using a non-volatile memory and the like. A component such as EEPROM (registered trademark) or fuse trimming is considered as the non-volatile memory. However, Embodiment 2 is not limited to the above components. A basic concentration detection method of the particulate detection sensor 1A is set to be identical to that in Embodiment 1. Specifically, the particulate detection sensor 1A subtracts the pulse count value counted in synchronization with lighting and lighting-off of the light emitting element 10 and calculates the particulate concentration, in a manner similar to the particulate detection sensor 1.

Adjustment of Reverse Bias Voltage by Change of Ambient Temperature

Firstly, a method of adjusting the reverse bias voltage VHV (see FIG. 2A) to be supplied to the SPAD array when the ambient temperature T changes will be described. When the ambient temperature T of the SPAD array changes. The breakdown voltage of the avalanche photodiode APD1 (SPAD) (see FIG. 2A) constituting the SPAD array light detecting unit 30 fluctuates depending on the ambient temperature T. Therefore, when the reverse bias voltage VHV to be supplied to the SPAD array is set to be constant, the avalanche multiplication factor of the SPAD fluctuates by the fluctuation of the ambient temperature T. As a result, the number of output pulses of the SPAD array light detecting unit 30 fluctuates largely. In particular, when the ambient temperature T is a high temperature, there is a possibility that the pulse count value to be measured increases largely. Thus, there is a concern that it is not possible to normally detect the particulate concentration. Therefore, a unit configured to adjust the reverse bias voltage VHV to be supplied to the SPAD array in accordance with the change of the ambient temperature T is desired.

Here, a third control signal TS3 in FIG. 6 is a signal used for controlling a voltage setting period VT in which the voltage setting unit 80 sets the reverse bias voltage VHV. The third control signal TS3 represents the voltage setting period VT. A fourth control signal TS4 is a signal for controlling a temperature detection period TT in which the temperature detection unit 70 performs temperature detection. The fourth control signal TS4 represents the temperature detection period TT. As the configuration of the temperature detection unit 70 in FIG. 6, for example, a configuration (thermal diode) of measuring a temperature change of a forward voltage value in a PN junction diode or a configuration of measuring a temperature change of a resistor such as a thermistor is considered. The configuration/type of a temperature sensor is not limited.

An adjustment unit of the reverse bias voltage VHV in Embodiment 2 in FIG. 6 will be described. Firstly, in the temperature detection unit 70 detects the ambient temperature T at a timing of the fourth control signal TS4 (temperature detection period), and the signal processing unit 50 determines the optimum setting value of the reverse bias voltage VHV from a detection result of the ambient temperature T. The voltage setting unit 80 updates or sets the reverse bias voltage VHV to have the optimum value at a timing of the third control signal TS3 (voltage setting period), and the optimum reverse bias voltage VHV is supplied to the SPAD array light detecting unit 30 by the voltage setting unit 80.

(1) and (2) as follows are performed, and thus the pulse count value in one measurement period MT is stable and measurable. (1) The temperature detection period TT controlled by the fourth control signal TS4 and the voltage setting period VT controlled by the third control signal TS3 are set to be synchronized with the measurement period MT.

(2) Further, an update timing of the voltage setting period VT, which is controlled by the third control signal TS3 is set at the beginning or the end of the measurement period MT and is not set in the pulse counting periods. Thus, at least, an occurrence of a situation in which the reverse bias voltage VHV in one measurement period MT is suddenly changed is suppressed.

There is a possibility that the measurement error of the temperature measurement value is caused by irradiating the temperature detection unit 70 (diode and the like) with the projection light E1 from the light emitting element 10. Thus, the temperature detection period TT is desirably set in at least the lighting-off period OFFT of the light emitting element 10.

Figure 7:
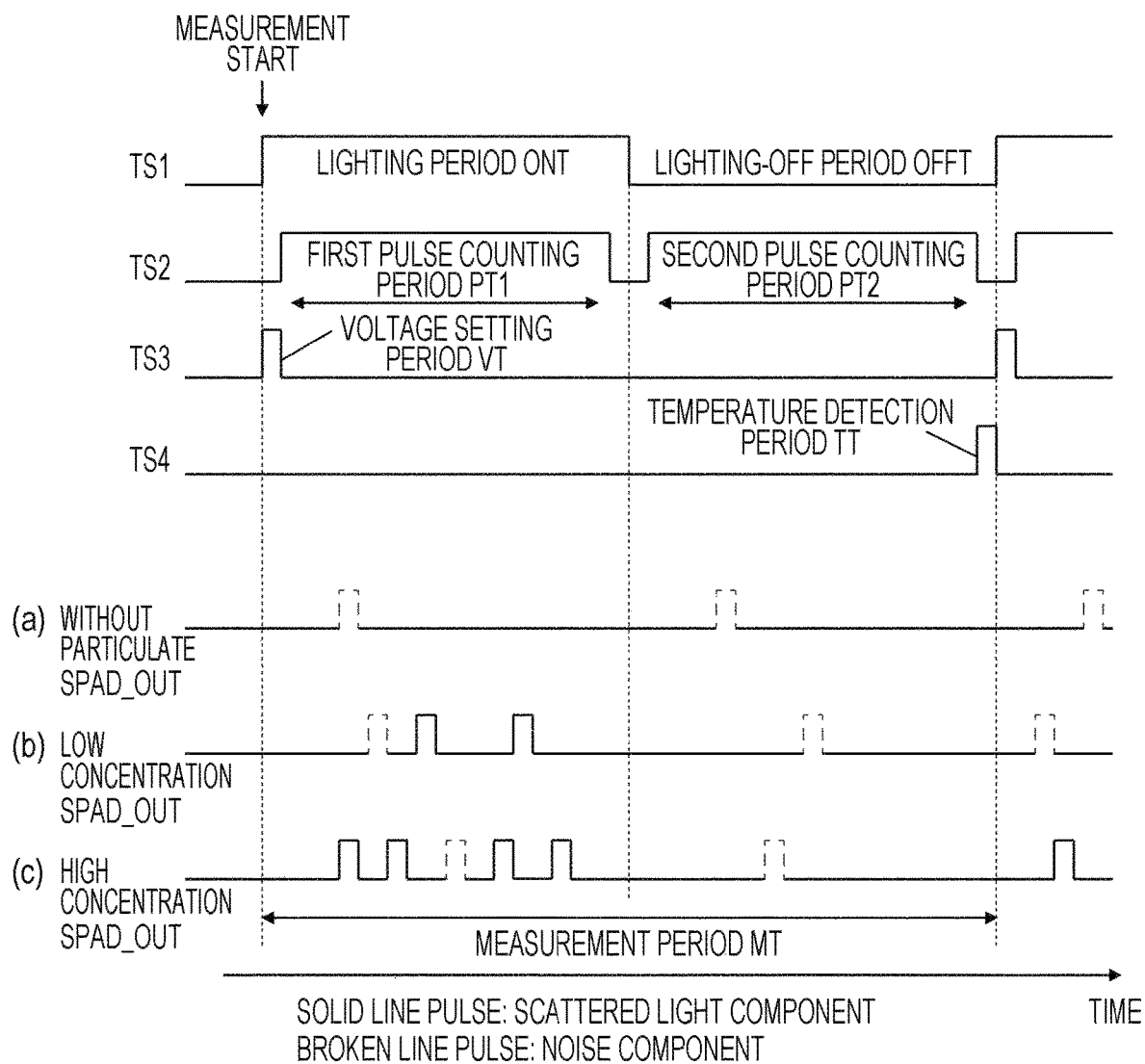
FIG. 7 is a diagram illustrating an example of an operation waveform of the particulate detection sensor.

FIG. 7 is a diagram illustrating an example of an operation waveform of the particulate detection sensor 1A. In FIG. 7, the first control signal TS1 and the second control signal TS2 are set in a manner similar to that in FIG. 4. Lighting and lighting-off of the light emitting element 10 are repeated at the Duty ratio of 50%, and the pulse counting periods are set during lighting and lighting-off. The third control signal TS3 is set to be at the H level just before the first pulse counting period PT1 in the lighting period ONT. The optimum reverse bias voltage VHV is updated or set during a period in which the third control signal TS3 is at the H level.

The fourth control signal TS4 is set to be at the H level after the end of the second pulse counting period PT2 in the lighting-off period OFFT. The ambient temperature T is detected by the temperature detection unit 70 during a period in which the fourth control signal TS4 is at the H level. As described above, the signal processing unit 50 determines the optimum setting value of the reverse bias voltage VHV with the detection result of the ambient temperature T, which is measured in the temperature detection period TT. In the next measurement, the setting value of the reverse bias voltage VHV is updated in the voltage setting period VT in which the third control signal TS3 is at the H level.

Thus, the reverse bias voltage VHV having a constant value is supplied to the SPAD array during the measurement period MT (during each of the pulse counting periods) without the reverse bias voltage VHV fluctuating in one measurement period MT. It is possible to update the reverse bias voltage VHV to the optimum value for each measurement period MT, and thus it is possible to realize the particulate detection sensor 1A capable of operating in a wide temperature range is possible.

Figure 8:
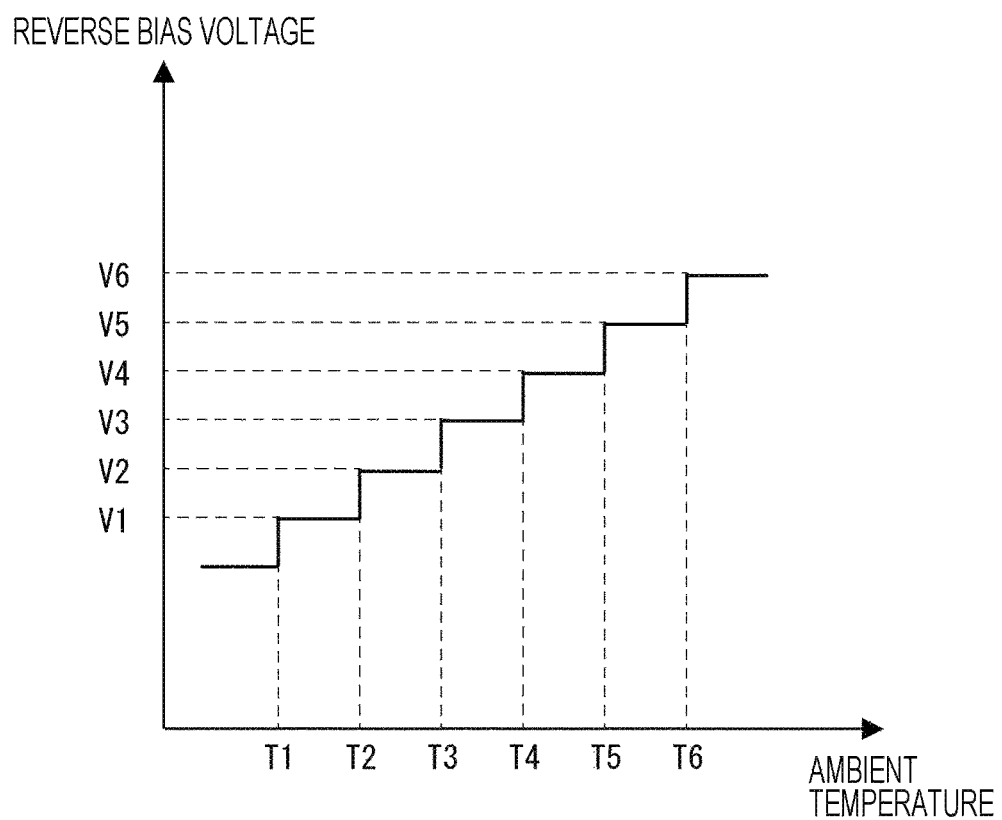
FIG. 8 is a graph illustrating an example of setting an optimum reverse bias voltage for an ambient temperature.

FIG. 8 is a graph illustrating an example of setting the optimum reverse bias voltage VHV for the ambient temperature T. In a case of the setting example illustrated in FIG. 8, a method of determining a predetermined table is determined, and determining the optimum value of the reverse bias voltage VHV in accordance with the detection result of the ambient temperature T is provided. Specifically, if the ambient temperature T is in a range of T1 to T2, the voltage setting value of the reverse bias voltage VHV is V1. There is no need to limit the above table to the table as in FIG. 8, and the table and the function for determining the optimum value of the reverse bias voltage VHV are desirably determined in accordance with characteristics of the avalanche photodiode APD constituting the SPAD array to be used.

Adjustment of Third Pulse Count Value by Change of Ambient Temperature

Figure 9A:
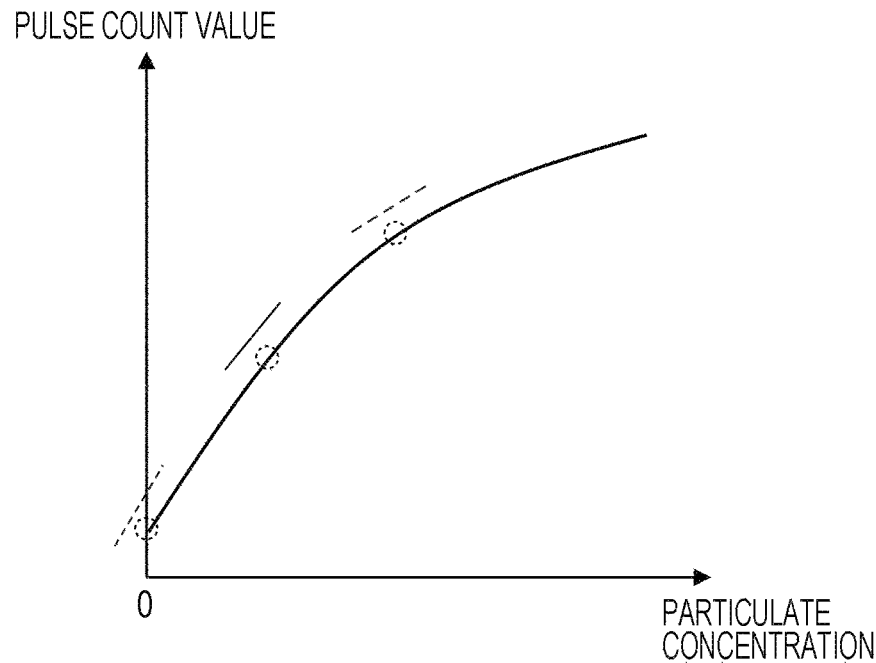
FIG. 9A is a graph illustrating an example of dependency of a first pulse count value on the particulate concentration at a certain temperature.

Next, a method of correcting the inclination of the third pulse count value PC3 to the particulate concentration when the ambient temperature T changes will be described. FIG. 9A is a graph illustrating an example of dependency of the first pulse count value PC1 on the particulate concentration at a certain temperature. In FIGS. 5A to 5C, the dependency of the first pulse count value PC1 on the particulate concentration is illustrated by a form which is linear (proportional). However, as described above, in practice, if the particulate concentration increases, and the pulse count value increases, a frequency that the SPAD cells constituting the SPAD array simultaneously cause avalanche multiplication becomes higher. Thus, the linearity of the first pulse count value PC1 to the particulate concentration is decreased. Therefore, as illustrated in FIG. 9A, characteristics that the first pulse count value PC1 is saturated as the particulate concentration increases are shown. In other words, the dependency of the first pulse count value PC1 on the particulate concentration is not proportional.

Even though the ambient temperature T changes, as described above, the reverse bias voltage VHV of the SPAD array is automatically adjusted by (the detection result of) the ambient temperature T, and the avalanche multiplication factor of the SPAD array is optimized. Therefore, particulate concentration dependency of the first pulse count value PC1 can be optimized to characteristics similar to those in FIG. 9A. However, the ambient temperature T rises, and finally, dependency (inclination) of the pulse count value on the particulate concentration fluctuates by the ambient temperature T. The reason is as follows. That is, since the number of carriers which are thermally generated increases, the number of noise pulses (number of dark pulses) caused by the increase increases, and thus the count value (intercept) when the particulate concentration is zero, that is, the count value of the noise component increases.

This will be described equivalently using circles and portions indicated by solid and broken lines in FIG. 9A. The leftmost circle is set to indicate the pulse count value of the noise component at a certain temperature. A circle on the right side (in the middle) thereof is set to indicate the pulse count value of the noise component at a temperature higher than the above temperature. The rightmost circle is set to indicate the pulse count value of the noise component at a further higher temperature. The inclination at each of the circles equivalently represents the inclination of the pulse count value with respect to the particulate concentration at each temperature. Therefore, it is understood that the inclination decreases by the increase of the ambient temperature T.

Figure 9B:
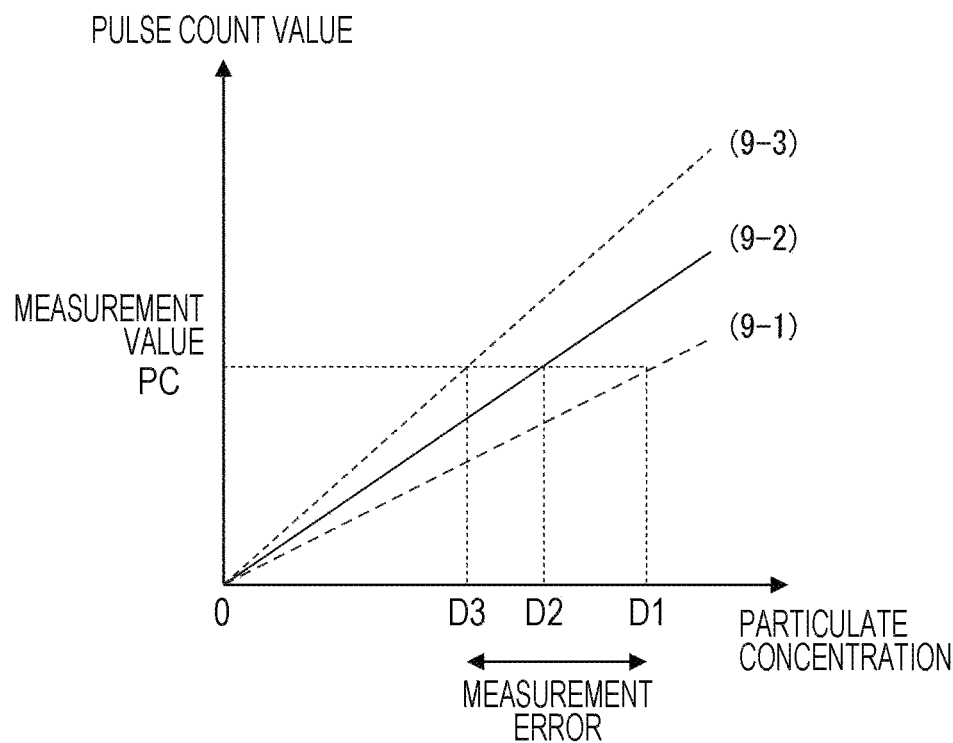
FIG. 9B is a graph illustrating an example of temperature dependency of the third pulse count value on the particulate concentration.

FIG. 9B is a graph illustrating an example of temperature dependency of the third pulse count value PC3 on the particulate concentration. In FIG. 9B, (9-1) represents the temperature dependency at the temperature, (9-2) represents temperature dependency at a normal temperature (25° C. or the like), and (9-3) represents temperature dependency at a low temperature. For simple descriptions, here, only temperature dependency in a relatively low-concentration area is displayed. Concentration dependency (inclination) of the third pulse count value PC3 is displayed as linear characteristics.

The count value of the noise component is removed by subtracting the second pulse count value PC2 from the first pulse count value PC1. Thus, the noise component (intercept) does not appear in the third pulse count value PC3. However, as described above, regarding the inclination (see FIG. 9A, a different result is obtained by the ambient temperature T. Therefore, if the ambient temperature T changes, the particulate concentration calculated from the measurement value (PC in FIG. 9B) of the third pulse count value PC3 has different results (D1 to D3), and a difference (D1 to D3) in detection result acts as the measurement error for the ambient temperature T. Accordingly, in order to improve the measurement accuracy of the particulate concentration with respect to the change of the ambient temperature T, it is desirable to perform temperature correction on the measurement result with respect to the change of the ambient temperature T. A temperature correction method of the measurement result will be described below.

Temperature Correction

The particulate detection sensor 1A performs temperature correction of the preset first calculation coefficient x1 used for calculating the concentration of the particulate, with a preset temperature correction coefficient y1 and the measurement result of the ambient temperature T measured by the temperature detection unit 70, so as to calculate a second calculation coefficient x2. The particulate detection sensor 1A calculates the concentration of the particulate with the second calculation coefficient x2 and the third pulse count value PC3 obtained by subtracting the second pulse count value PC2 from the first pulse count value PC1.

Figure 10:
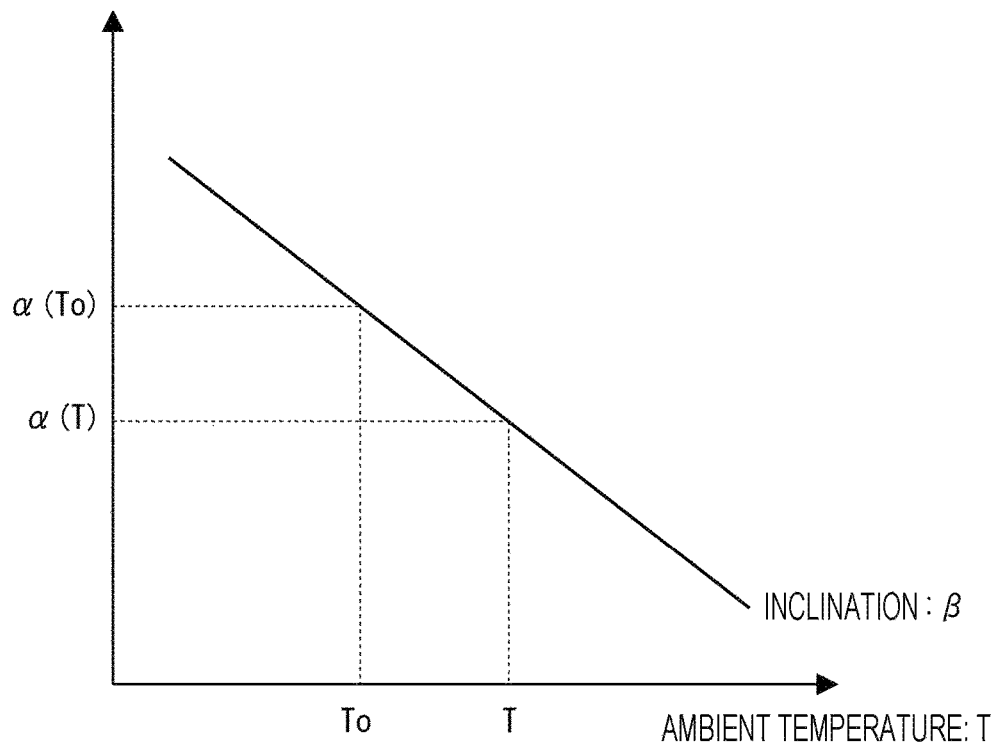
FIG. 10 is a graph illustrating an example of the temperature dependency of an inclination $\alpha(T)$ of the third pulse count value.

FIG. 10 is a graph illustrating an example of the temperature dependency of an inclination $\alpha(T)$ of the third pulse count value PC3. For simple descriptions, the inclination $\alpha(T)$ is a linear function (linear characteristics) of the temperature T. Here, if the inclination in the inclination $\alpha(T)$ with respect to the temperature T is set to $\beta$ (integer), and the inclination at a reference temperature To is set to $\alpha(To)$, a relation between the inclination $\alpha(T)$, T, and $\beta$ can be represented by the following expression.

$$\alpha(T)=\alpha(To)+(T-To)\times\beta \quad \text{(Expression 3-a)}$$

Here, the particulate concentration is set to D, and a relation between the particulate concentration D and the third pulse count value PC3 (PC3(T)) at a measurement temperature T has the following (Expression 3-b). If (Expression 3-a) is substituted into (Expression 3-b), the particulate concentration D has the following (Expression 3-c).

$$PC3(T)=\alpha(T)\times D \quad \text{(Expression 3-b)}$$

$$D=PC3(T)/\alpha(T)=PC3(T)/(\alpha(To)+(T-To)\times\beta) \quad \text{(Expression 3-c)}$$

With (Expression 3-c), it is possible to detect the particulate concentration D subjected to temperature correction, by using the third pulse count value PC3 (PC(T)) at the measurement temperature T, a temperature detection result T (temperature T) measured by the temperature detection unit 70, the reference temperature To, the inclination $\alpha(To)$ at the reference temperature To, and the inclination $\beta$ in the inclination $\alpha(T)$. That is, it is possible to detect the accurate particulate concentration D without depending on the ambient temperature T, by the measured third pulse count value PC3 and the calculation coefficient (inclination $\alpha(T)$ (second calculation coefficient x2)) subjected to temperature correction.

Here, To, $\alpha(To)$, and $\beta$ are used as the temperature correction coefficient y1 used for performing temperature correction of the calculation coefficient used for calculation, and are stored, for example, in the storage unit 90 illustrated in FIG. 6 and used as the temperature correction coefficient y1 when the signal processing unit 50 performs calculation. In the above descriptions, for simple descriptions, $\alpha(T)$ is set to the linear function of T. However, even when $\alpha(T)$ is set to a higher-order function of a quadratic function or higher, similar correction is possible.

Further, when the temperature correction coefficient y1 differs for each particulate detection sensor 1A by variations and the like in manufacturing, measurement is performed at ambient temperatures T (including the reference temperature To) corresponding to at least two points or more, in the inspection processing in manufacturing. β is calculated from the measurement result of the inclination α(T) with respect to the particulate concentration at the measurement temperatures. The measured coefficient is stored in the storage unit 90 in each particulate detection sensor 1A, as the initial setting value. Thus, it is possible to correct deviation of the dependency on the ambient temperature T, which is caused by manufacturing variation. As a result, it is possible to further suppress the measurement error of the particulate concentration with respect to the change of the ambient temperature T.

It is possible to suppress the measurement error with respect to the change of the ambient temperature, by correcting the manufacturing variation. However, an inspection in the temperature condition of two points or more is desired in the inspection processing, and thus there is a possibility that manufacturing cost of the particulate detection sensor 1A increases. Therefore, it is desirable to select whether or not the method of correcting the manufacturing variation is performed, in accordance with the target (measurement accuracy, cost) desired for the particulate detection sensor 1A. Due to the manufacturing variation and the like, when the temperature correction coefficient y1 in each particulate detection sensor 1A hardly changes, the temperature correction coefficient y1 may be incorporated as a fixed value in the calculation expression of the signal processing unit 50. When a microcomputer or the like outside the particulate detection sensor 1A performs the calculation processing, the temperature correction coefficient y1 may be stored in a memory of the microcomputer or the like.

As described above, in the configuration in Embodiment 2, it is possible to realize the particulate detection sensor 1A in which an operation in a wide temperature range is possible, and it is possible to measure the accurate particulate concentration with respect to the fluctuation of the ambient temperature T.

Adjustment of Manufacturing Variation

Next, a correction method of the manufacturing variation of the particulate detection sensor 1A will be described. Generally, the SPAD array light detecting unit 30 is formed on a semiconductor substrate. Therefore, variation may occur in avalanche multiplication factors and noise components (dark pulses and the like) for each configured SPAD, by the manufacturing variation such as semiconductor crystal defects and impurity concentration variation. In addition, there is a possibility that the measurement accuracy of the particulate concentration is decreased.

Regarding the light emitting element 10, there is also a possibility that variation occurs in optical characteristics such as the emitted light quantity or directivity, by the manufacturing variation. Similarly, there is a possibility that the measurement accuracy is decreased. Further, due to variation of the breakdown voltage of the SPAD array light detecting unit 30 or manufacturing variation of the reverse bias voltage VHV in the voltage setting unit 80, the reverse bias voltage VHV to be supplied to the SPAD array light detecting unit 30 is not optimized, and similarly, there is a possibility that the measurement accuracy is decreased, or measurement is not possible.

Thus, in order to improve the measurement accuracy of the particulate concentration, a configuration in which the measurement error or the deviation of the operation condition by the manufacturing variation can be adjusted in manufacturing is desirable. An example of a method for implementing this will be described below.

Optimization of Pulse Count Value

Figure 11A:
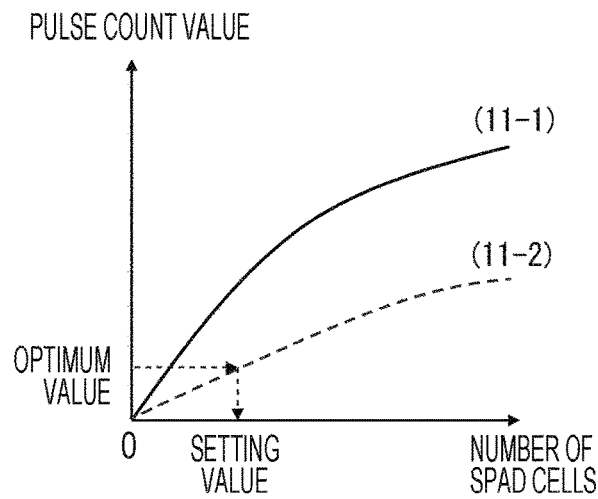
FIG. 11A is a graph illustrating an example of dependency of the first pulse count value and a second pulse count value on the number of SPAD cells.

A method of optimizing the pulse count value of the noise component will be described. FIG. 11A is a graph illustrating an example of dependency of the first pulse count value PC1 and the second pulse count value PC2 on the number of SPAD cells. In FIG. 11A, (11-1) represents an example of the dependency of the first pulse count value PC1 in the lighting period on the number of SPAD cells. (11-2) represents an example of the dependency of the second pulse count value PC2 in the lighting-off period on the number of SPAD cells. In FIG. 11A, it is assumed that the particulate concentration, the emitted light quantity, and the pulse counting periods are fixed to certain values.

As represented by (11-2) in FIG. 11A, the number of SPAD cells cell causing the pulse count value of the noise component in the inspection processing in manufacturing to have the optimum value is selected using a point that the pulse count value of the noise component increases or decreases by the increase or decrease of the number of SPAD cells cell. The number of SPAD cells cell is selected by the second adjustment signal S2 output from the control unit 60 illustrated in FIG. 6. The optimization result (second adjustment signal S2) of the number of SPAD cells cell is stored in the storage unit 90, as the initial setting value.

The method of selecting the number of SPAD cells cell is not particularly limited. Selection and adjustment in which the number of SPAD cells cell uniformly increases or decreases in the entirety of the SPAD array may be performed, or an adjustment method of selecting validity or invalidity of a predefined area may be provided. In other words, the second adjustment signal S2 is a signal for adjusting the operation condition of the SPAD array light detecting unit 30. The SPAD array light detecting unit 30 may have a function to set each of SPAD cells cell constituting the SPAD array light detecting unit 30 to be valid or invalid, by the second adjustment signal S2. The reason of correcting the noise component to the optimum value is that the inclination α fluctuates by the magnitude of the count value of the noise component.

Optimization of Inclination α

Figure 11B:
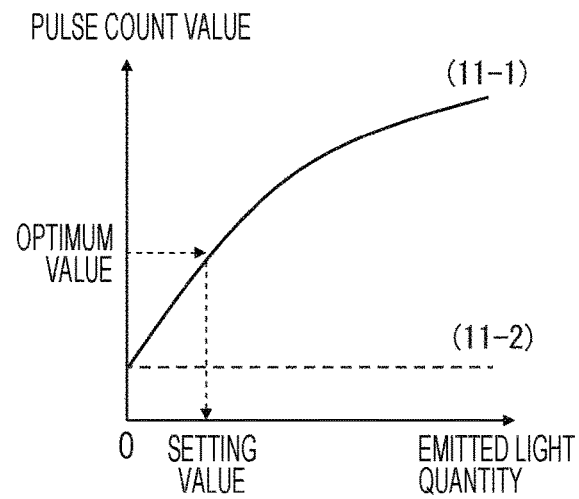
FIG. 11B is a graph illustrating an example of dependency of the first pulse count value and the second pulse count value on an emitted light quantity.

A method of optimizing the inclination α of the pulse count value will be described. FIG. 11B is a graph illustrating an example of dependency of the first pulse count value PC1 and the second pulse count value PC2 on the emitted light quantity. In FIG. 11B, (11-1) represents an example of the dependency of the first pulse count value PC1 in the lighting period on the emitted light quantity. (11-2) represents an example of the dependency of the second pulse count value PC2 in the lighting-off period on the emitted light quantity.

In FIG. 11B, it is assumed that the particulate concentration and the pulse counting period are fixed to certain values, and the number of SPAD cells cell is set to the value optimized in the above-described method. Here, (11-1) shows that the pulse count value of the scattered light component from particulates is provided, and thus the pulse count value increases by the increase of the emitted light quantity. However, (11-2) shows a constant value being the pulse count value of only the noise component. In the inspection processing in manufacturing, the emitted light quantity causing the inclination α of the pulse count value to have the optimum value is selected using the dependency. The emitted light quantity in the driving unit 20 of the light emitting element 10 is adjusted by the first adjustment signal S1 output from the control unit 60 illustrated in FIG. 6. In other words, the first adjustment signal S1 is a signal for adjusting the operation condition of the driving unit 20. The driving unit 20 has a function to adjust the emitted light quantity of the light emitting element 10 by the first adjustment signal S1. The first adjustment signal S1 is stored in the storage unit 90 as the initial setting value.

Optimization of Reverse Bias Voltage

Figure 11C:
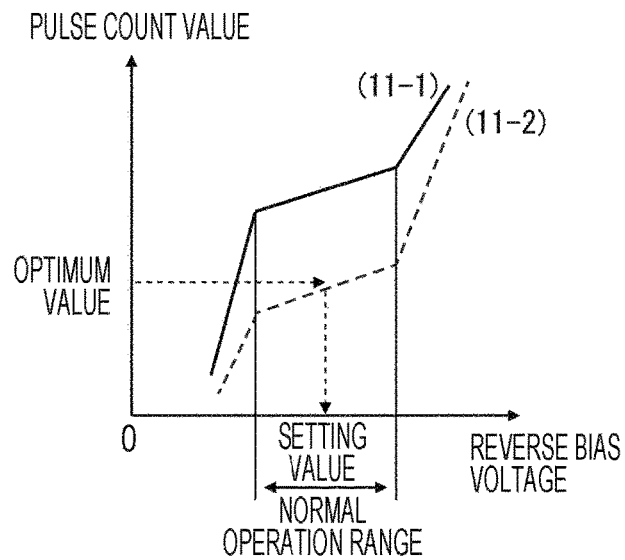
FIG. 11C is a graph illustrating an example of dependency of the first pulse count value and the second pulse count value on the reverse bias voltage.

A method of optimizing the reverse bias voltage VHV to be supplied to the SPAD array light detecting unit 30 will be described. FIG. 11C is a graph illustrating an example of dependency of the first pulse count value PC1 and the second pulse count value PC2 on the reverse bias voltage. In FIG. 11C, (11-1) represents an example of the dependency of the first pulse count value PC1 in the lighting period on the reverse bias voltage VHV. (11-2) represents an example of the dependency of the second pulse count value PC2 in the lighting-off period on the reverse bias voltage VHV.

If the reverse bias voltage VHV increases too much and is out of an optimum range, the avalanche multiplication factor increases too much, and the pulse count value increases very largely. Thus, normal measurement is not possible. If the reverse bias voltage VHV is reduced too much and is out of the optimum range, the reverse bias voltage VHV becomes lower than the breakdown voltage of the SPAD, and thus the SPAD operates in the linear mode, not in the Geiger mode. Therefore, the pulse count values are reduced very low, and the normal measurement is not possible.

As described above, the manufacturing variation in the SPAD cell or the voltage setting unit 80 causes the reverse bias voltage VHV to deviate from the optimum range. Thus, the normal measurement is possible by setting the reverse bias voltage VHV to be in the optimum range. As a specific method, in the inspection processing in manufacturing, reverse bias voltage VHV dependency of each pulse count value is measured, and the reverse bias voltage VHV causing the pulse count values to have the optimum values is selected. For example, as illustrated in FIG. 11C, in the inspection processing, a normal operation range of the reverse bias voltage VHV may be roughly detected from the measurement result of each pulse count value, and the intermediate value may be selected for the reverse bias voltage VHV. Here, the purpose is to set the reverse bias voltage VHV causing the pulse count value not to increase or decrease largely, and thus rough setting may be performed.

The reverse bias voltage VHV is adjusted in a manner that the voltage setting unit 80 sets the reverse bias voltage VHV (initial value) by the third adjustment signal S3 output from the control unit 60 illustrated in FIG. 6, and the reverse bias voltage VHV is supplied to the SPAD array light detecting unit 30. In other words, the third adjustment signal S3 is a signal for adjusting the operation condition of the voltage setting unit 80. The voltage setting unit 80 has a function to adjust the reverse bias voltage VHV by the third adjustment signal S3. The third adjustment signal S3 determined in an inspection is stored in the storage unit 90 as the initial setting value. The value of the reverse bias voltage VHV stored as the initial setting value is the reverse bias voltage VHV which becomes optimum at the reference temperature To. A table of the reverse bias voltage VHV with respect to the ambient temperature T, which is described with reference to FIG. 8 is desirably adjusted to correspond to the correction result at the reference temperature To.

As described above, setting values of the number of SPAD cells cell, the emitted light quantity, and the reverse bias voltage VHV are adjusted from an inspection result in the inspection processing, and the first adjustment signal S1 to the third adjustment signal S3 for adjusting the number of SPAD cells cell, the emitted light quantity, and the reverse bias voltage VHV are stored in the storage unit 90 as the initial setting values. Thus, it is possible to suppress the measurement error caused by the manufacturing variation or deviation of the measurement value in each particulate detection sensor 1A, and thus it is possible to realize the particulate detection sensor 1A having high measurement accuracy of the particulate concentration.

Adjustment of Temperature Correction Coefficient with Respect to Manufacturing Variation Next, an example of a specific order of measurement and adjustment when the manufacturing variation of the temperature correction coefficient of the inclination is adjusted with respect to the ambient temperature T in addition to the adjustment of the manufacturing variation will be described.

Firstly, in the inspection processing in manufacturing, reverse bias voltage VHV dependency of the second pulse count value PC2 during lighting-off, in a state of an inspection temperature To (reference temperature To) and no particulate, is measured. Here, measurement in a state where particulates are present may be performed. From the measurement result, the normal operation range of the reverse bias voltage VHV causing the second pulse count value PC2 not to increase or decrease largely is detected. The intermediate value is set to a setting value VHVo of the reverse bias voltage, and the value is stored in the storage unit 90 as the third adjustment signal S3.

Then, the dependency of the second pulse count value PC2 on the number of SPAD cells cell is measured in a state of the inspection temperature To (reference temperature To), the reverse bias voltage VHVo, and no particulate. Here, measurement in a state where particulates are present may be performed. From the measurement result, the number Co of SPAD cells cell causing the second pulse count value PC2 (noise component) to have the optimum value is determined, and the value is stored in the storage unit 90 as the second adjustment signal S2.

Then, with the inspection temperature To (reference temperature To), the reverse bias voltage VHVo, and the number Co of SPAD cells cell, two measurements is performed in a state with no particulate (particulate concentration=0) and in a state where particulate are present (reference particulate concentration Do). From the measurement values in two measurements, the first pulse count value PC1 or the inclination $\alpha$(To) of the third pulse count value PC3 is measured, and the dependency of the inclination $\alpha$(To) on the emitted light quantity is measured. From the measurement result, an emitted light quantity Lo causing the inclination $\alpha$(To) to have the optimum value is determined, and the value is stored in the storage unit 90 as the first adjustment signal S1.

Then, the manufacturing variation of the temperature correction coefficient in the inclination $\alpha$(T) is adjusted. The inclination $\alpha$(To) at the reference temperature To is measured when the inclination is corrected. Thus, the inclination $\alpha$(T1) at another inspection temperature T1 in the setting condition (reverse bias voltage VHVo (T1), the number Co of SPAD cells cell, and emitted light quantity Lo) is measured. Here, the reverse bias voltage VHVo (T1) has a value of a reverse bias voltage obtained in a manner that the reverse bias voltage VHVo being the initial setting value at the reference temperature To is automatically adjusted in measurement at the reference temperature To T1 based on FIG. 8. As in FIG. 10, if the temperature dependency of $\alpha$(T) has linear characteristics, it is possible to calculate the inclination $\beta$ with respect to the temperature of the inclination $\alpha$(T), from the inclination $\alpha$(To) and the measurement value with the inclination $\alpha$(T1). The inclination $\beta$, the reference temperature To, and the inclination $\alpha$(To) at the reference temperature are stored in the storage unit 90 as temperature correction coefficients of a calculation coefficient α(T) (third calculation coefficient x3) which will be described later. With the above adjustment method, in the inspection processing in manufacturing, it is possible to suppress the measurement error caused by the manufacturing variation.

Here, the reference temperature To stored in the storage unit 90 corresponds to a temperature detection result To_1 at the inspection temperature To (reference temperature To). The reason that it is desirable to store the temperature detection result To_1 at the inspection temperature To is as follows. That is, since the measurement value To (inspection temperature To) is the measurement result just in the temperature detection unit 70, and the measurement value To (inspection temperature To) varies in each particulate detection sensor 1A, it is desirable to store the temperature detection result To_1 at the inspection temperature To, in each particulate detection sensor 1A. In other words, obtaining an absolute temperature output is not desired. With the above-described method, correction is possible with including the manufacturing variation of the temperature detection unit 70.

Suppression of Measurement Error Caused by Stray Light Component

Next, a unit configured to suppress the measurement error which appears in the third pulse count value PC3 after the subtraction and is caused by the pulse count value of the stray light component will be described. Here, the stray light indicates undesirable light which is incident to the SPAD array light detecting unit 30 to be separate from the scattered light component which is obtained in a manner that light projected from the light emitting element 10 is scattered by particulates, and is incident to the SPAD array light detecting unit 30. Pulse counting is performed on the stray light component, for example, in a manner that (1) the projection light E1 from the light emitting element 10 is reflected by the housing, the cover, or the like of the particulate detection sensor 1A and then is incident to the SPAD array light detecting unit 30, or in a manner that (2) light projected from the light emitting element 10 is directly incident to the SPAD array light detecting unit 30. Ideally, a configuration in which the SPAD array light detecting unit 30, the light emitting element 10, and the detection area are arranged such that the above-described stray light component is 0 (zero) or very small is desirable. However, the configuration is difficult in practice. Thus, a unit configured to correct or suppress the measurement error caused by the pulse count value of the stray light component is desired.

Figure 12A:
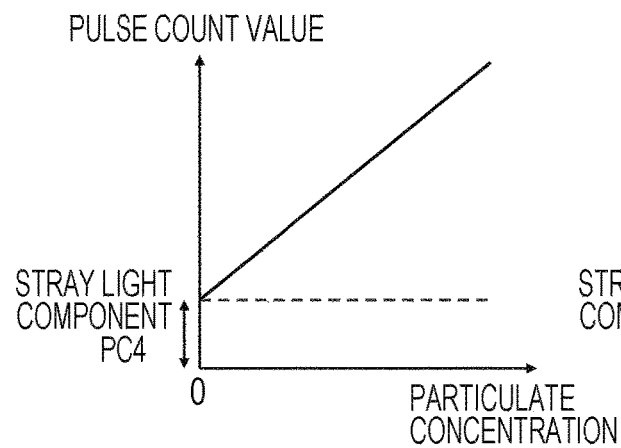
FIG. 12A is a graph illustrating an example of dependency of the third pulse count value on the particulate concentration when stray light is incident to the SPAD array light detecting unit.

FIG. 12A is a graph illustrating an example of dependency of the third pulse count value PC3 on the particulate concentration when stray light is incident to the SPAD array light detecting unit 30. The stray light component is similar to the pulse count value of the noise component described with reference to FIGS. 5A to 5C and the like. The stray light component has a constant value with respect to the particulate concentration, without depending on the particulate concentration. As described above, the stray light component is generated in a manner that reflected light from the housing or the sensor cover of the particulate detection sensor 1A or direct light from the light emitting element 10 is incident to the SPAD array light detecting unit 30. Therefore, there is a possibility that the pulse count value of the stray light component varies in each particulate detection sensor 1A by variation and the like in mounting positions of the constituent components in manufacturing.

Regarding the unit configured to correct the measurement error caused by pulse counting of the stray light component, for example, in the inspection processing in manufacturing, the fourth pulse count value PC4 of only the stray light component is measured (in at least one or more measurements) by performing measurement in a state of no particulate. When the particulate concentration is measured, the signal processing unit 50 may calculate and detect the particulate concentration in a state where the fourth pulse count value PC4 is further subtracted from the measured third pulse count value PC3. The particulate concentration D can be represented by the following expression with the inclination α of the third pulse count value PC3 as the calculation coefficient (third calculation coefficient x3).

$PC3 = \alpha \times D + PC4$ (Expression 4-a)

$D = (PC3 - PC4)/\alpha$ (Expression 4-b)

The fourth pulse count value PC4 measured in the inspection processing is stored in the storage unit 90 in FIG. 6 as the initial setting value, and is used as the fourth calculation coefficient x4 when the signal processing unit 50 performs calculation. With this unit, it is possible to suppress the measurement error caused by the fourth pulse count value PC4 of the stray light component with including the manufacturing variation. Thus, even in the structure of the particulate detection sensor 1A, in which it is not possible to completely remove the stray light component, it is possible to suppress the decrease of the measurement accuracy.

Figure 12B:
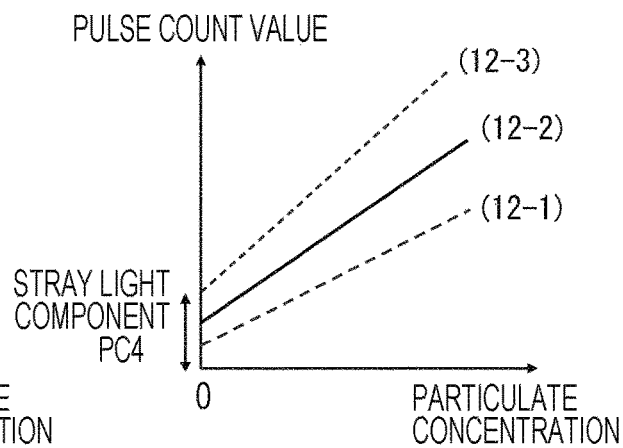
FIG. 12B is a graph illustrating an example of temperature dependency of the third pulse count value on the particulate concentration when temperature dependency of a stray light component is large.

Effectiveness of the above unit is limited to a case where the fourth pulse count value PC4 caused by the stray light component is relatively small or a case where the fourth pulse count value PC4 does not largely fluctuate by the ambient temperature T. FIG. 12B is a graph illustrating an example of temperature dependency of the third pulse count value PC3 on the particulate concentration when temperature dependency of a stray light component is large. In FIG. 12B, (12-1) represents the temperature dependency at the temperature, (12-3) represents temperature dependency at a low temperature, and (12-2) represents temperature dependency at an intermediate temperature (normal temperature or the like) between the temperature in (12-1) and the temperature in (12-3).

A difference between the stray light component and the scattered light component is that the light component depends or does not depend on particle concentration. The scattered light component depends on the particle concentration, but the stray light component does not depend on the particle concentration. That is, the temperature dependency of the pulse count value of the stray light component is identical to the temperature dependency of the pulse count value of the scattered light component. Therefore, in a case where the temperature dependency of the inclination α(T) is as in FIG. 10, and the temperature dependency of the stray light component is large, the temperature dependency of the third pulse count value PC3 on the particulate concentration is as illustrated in FIG. 12B. In such a case, it is also possible to suppress the measurement error caused by the stray light to some degrees by the above unit (subtraction of the fourth pulse count value PC4 of the stray light component from the third pulse count value PC3 in an inspection).

However, in a case where it is desirable to set the measurement accuracy of the particulate concentration at a certain ambient temperature T to be high, the suppression is insufficient only by the unit. In such a case, as will be described below, a unit configured to perform temperature correction of the fourth pulse count value PC4 of the stray light component and then perform calculation processing of the particulate concentration is desirable.

Firstly, at the measurement temperature T, the third pulse count value PC3 is set to PC3(T), the fourth pulse count value PC4 of the stray light component is set to PC4(T), and the inclination of the third pulse count value PC3 is set to α(T). If PC3(T), PC4(T), and α(T) are used as the calculation coefficient, and the particulate concentration is set to D, the above relation can be represented by the following expression.

$$PC3(T)=\alpha(T)\times D+PC4(T) \quad \text{(Expression 4-c)}$$

Figure 12C:
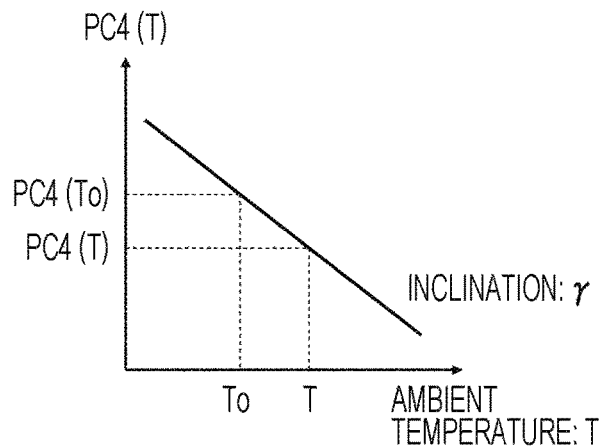
FIG. 12C is a graph illustrating an example of temperature dependency of a fourth pulse count value.

Here, when ambient-temperature dependency of PC4(T) has a linear function (linear characteristics) with respect to the ambient temperature T as in FIG. 12C, if the inclination with respect to the temperature of PC4(T) is set to γ, and the fourth pulse count value PC4 at the reference temperature To is set to PC4(To), PC4(T) can be represented by the following expression.

$$PC4(T)=PC4(To)+(T-To)\times\gamma \quad \text{(Expression 4-d)}$$

Here, the inclination α(T) with respect to the particulate concentration of PC3(T) can be represented by (Expression 3-a). Thus, the particulate concentration D can be calculated with the following expression, from (Expression 3-a), (Expression 4-c), and (Expression 4-d).

$$\begin{aligned} D &= \{PC3(T) - PC4(T)\}/\alpha(T) \\ &= \{PC3(T) - PC4(To) - (T-To)\times\gamma\}/ \\ &\quad (\alpha(To) + (T-To)\times\beta) \end{aligned} \quad \text{(Expression 4-e)}$$

In (Expression 4-e), the inclination α(T) of PC3(T) is set as the calculation coefficient (third calculation coefficient x3). In (Expression 4-e), the particulate concentration D is calculated using the temperature detection result T at the ambient temperature T, PC3(T) being the measurement result of the third pulse count value PC3 at the ambient temperature T, PC4(To) stored in the storage unit 90, and the temperature correction coefficients (integers) of the inclination α(To), To, β, and γ. With (Expression 4-e), even in the particulate detection sensor 1A in which it is not possible to ignore incidence of the stray light component, temperature correction including the temperature dependency of the stray light component is possible.

When the temperature correction coefficient differs (varies) for each particulate detection sensor 1A by variation in manufacturing and the like, it is possible to correct deviation of the ambient temperature T dependency, which is caused by the manufacturing variation, by performing the followings. That is, in the inspection processing in manufacturing, measurement is performed at ambient temperatures T (including the reference temperature To) corresponding to at least two points or more. The inclination β and the inclination γ are calculated from the inclination α at the measurement temperature and the measurement result of the fourth pulse count value PC4 at each of the points, and the integers obtained by the measurement are stored in the storage unit 90 in each particulate detection sensor 1A. Thus, it is possible to correct deviation of the dependency on the ambient temperature T, which is caused by manufacturing variation. As a result, it is possible to further improve the measurement accuracy of the particulate concentration.

It is possible to further improve the measurement accuracy of the particulate concentration by correcting the manufacturing variation. However, an inspection in the temperature condition of two points or more is desired in the inspection processing, and thus there is a possibility that manufacturing cost of the sensor increases. Therefore, it is desirable to select whether or not the method of correcting the manufacturing variation is performed, in accordance with the target specification (measurement accuracy, cost) desired for the particulate detection sensor 1A.

Embodiment 3

In Embodiment 2, the correction unit when the stray light is incident to the SPAD array light detecting unit 30 is described. However, when the stray light component incident to the SPAD array light detecting unit 30 is much larger than the scattered light component, the pulse count value increases as a whole, and linearity with respect to the particulate concentration decreases. As a result, there is a possibility that the measurement accuracy desired for the particulate detection sensor 1A is not obtained even using the suppression method. Thus, it is desirable that the SPAD array light detecting unit 30 of the particulate detection sensor 1A has a configuration of enabling adjustment such that the stray light component is not incident as much as possible, or the influence of the stray light component is minimized. Embodiment 3 as an example for realizing such a configuration will be described below.

As illustrated in FIG. 6, as the configuration of the particulate detection sensor 1B, a SPAD array light detecting unit 30B is provided instead of the SPAD array light detecting unit 30. It is assumed that the SPAD array light detecting unit 30B may be divided into at least two or more areas and be selected. Regarding the stray light component incident to the SPAD array light detecting unit 30B, in some cases, the stray light component is incident to the entirety of the SPAD array with uniform intensity. In many cases, the stray light component is strongly incident to a specific area and is weakly incident to other areas. In many cases, distribution of incident intensity of the stray light in each SPAD array area fluctuates by the shift and the like of mounting positions of constituent components, which are caused by the manufacturing variation. Thus, in each particulate detection sensor 1B, if a specific area of the SPAD array, to which the stray light component is incident small, and the scattered light component is incident largely is selected, and then measurement is performed, it is possible to realize the particulate detection sensor 1B in which it is possible to minimize the influence of the stray light component. Specifically, if the stray light component is set to N, and the scattered light component is set to S, an area of the SPAD array, in which the S/N ratio becomes the maximum is selected, and then measurement is performed. In this manner, it is possible to realize the particulate detection sensor 1B in which it is possible to minimize the influence of the stray light component.

Figure 13:
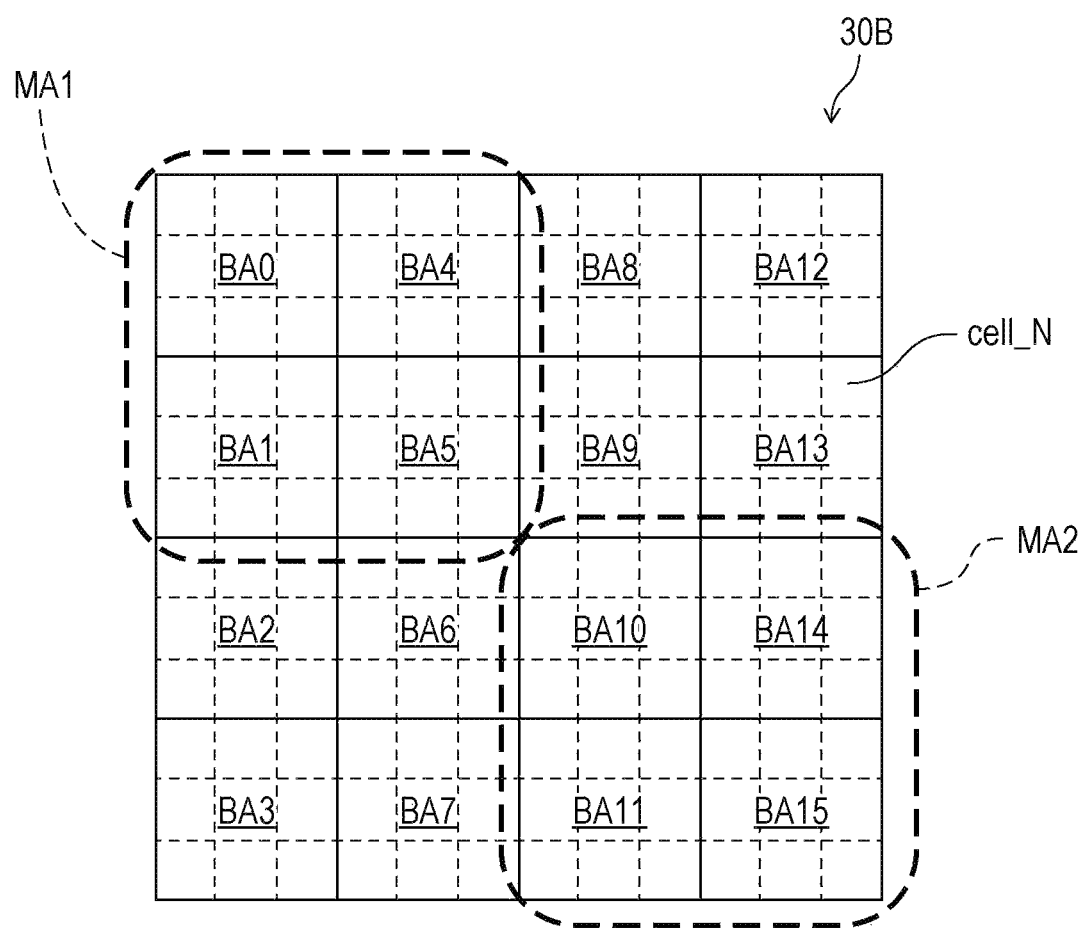
FIG. 13 is a diagram illustrating an example of measurement area selection unit in a SPAD array light detecting unit of a particulate detection sensor according to Embodiment 3 of the present disclosure.

The above unit will be described with reference to FIG. 13. FIG. 13 is a diagram illustrating an example of measurement area selection unit in the SPAD array light detecting unit 30B of the particulate detection sensor 1B according to Embodiment 3 of the present disclosure. An SPAD array illustrated in FIG. 13 is configured by 12×12 (144 cells) SPAD cells cell. Firstly, the SPAD array light detecting unit 30B divides the 144 SPAD cells by an area of 3×3 (9 cells) as a reference area BA0 to a reference area BA15 (16 areas). When the particulate concentration is measured, the SPAD array light detecting unit 30B performs measurement using an area of 6×6 (36 cells) obtained by selecting 2×2 areas (total four areas) as the reference area BA, as indicated by a broken line box. The area in which the measurement is performed is set to a measurement area MA.

In the inspection processing in manufacturing, the measurement area configured by four (2×2) areas as the reference area BA is sequentially selected, and then measurement is performed. Specifically, firstly, measurement is performed in a measurement area MA1 configured by the reference area BA0, the reference area BA1, the reference area BA4, and the reference area BA5. Then, measurement is performed in a measurement area configured by the reference area BA1, the reference area BA2, the reference area BA5, and the reference area BA6, and such a measurement is repeated. Finally, measurement is performed in a measurement area MA2 configured by the reference area BA10, the reference area BA11, the reference area BA14, and the reference area BA15.

Figure 14A:
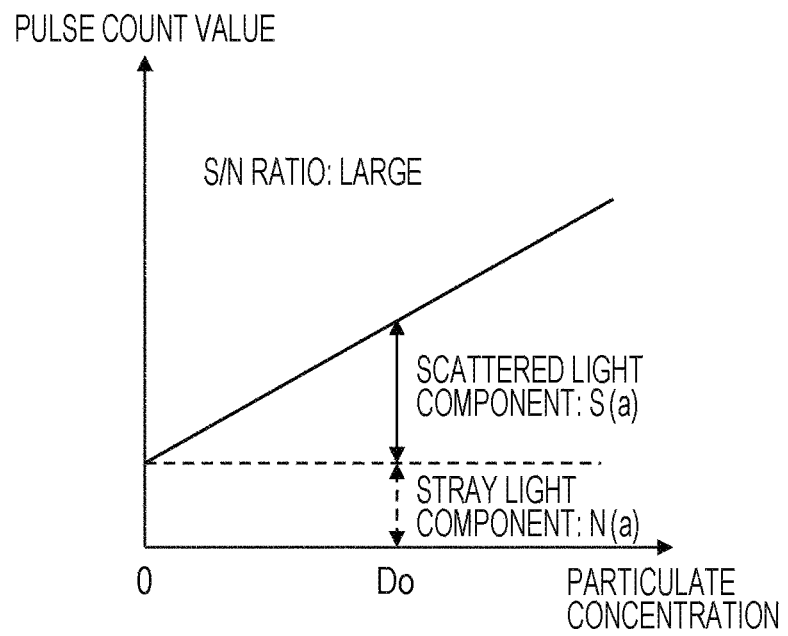
FIG. 14A is a diagram illustrating an example of a relation between the first pulse count value and the particulate concentration when an S/N ratio is relatively large.
Figure 14B:
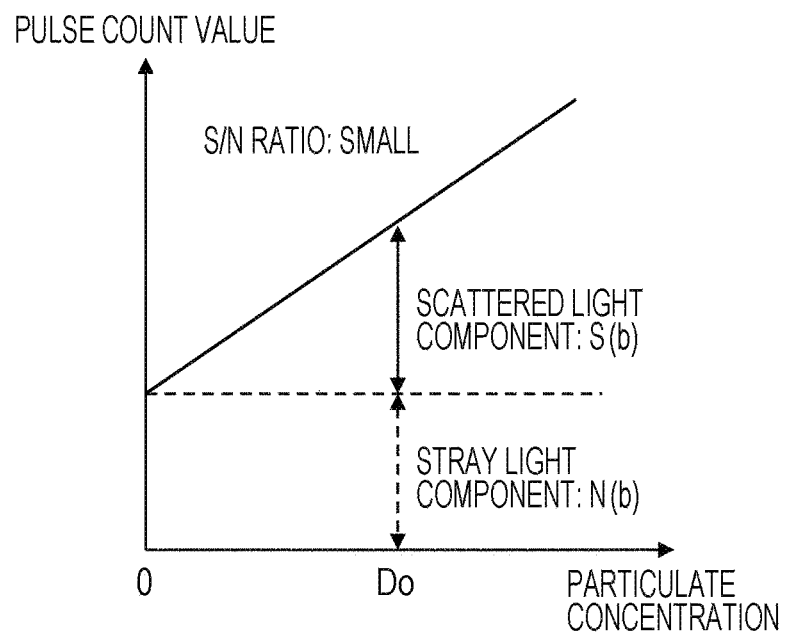
FIG. 14B is a diagram illustrating an example of the relation between the first pulse count value and the particulate concentration when the S/N ratio is relatively small.

As illustrated in FIGS. 14A and 14B, measurement is performed for each measurement area MA when the particulate concentration is 0 (zero) and when the particulate concentration is at certain reference concentration Do, and a ratio between the scattered light component S and the stray light component N is calculated, and the measurement area MA causing the S/N ratio to be the maximum is determined. Here, FIG. 14A is a diagram illustrating an example of a relation between the first pulse count value PC1 and the particulate concentration when an S/N ratio is relatively large. FIG. 14B is a diagram illustrating an example of the relation between the first pulse count value PC1 and the particulate concentration when the S/N ratio is relatively small. The stray light component N is the measurement result itself when the particle concentration is 0 (zero). The scattered light component S has a value obtained by subtracting the stray light component N from the measurement result at the reference concentration Do.

The measurement area MA of the SPAD array, which has been determined by the above measurement is set by the second adjustment signal S2 output from the control unit 60 illustrated in FIG. 6. The second adjustment signal S2 is stored in the storage unit 90 as the initial setting value. Thus, it is possible to measure the scattered light E2 in a SPAD area influenced the smallest by the stray light component, and it is possible to realize the particulate detection sensor 1B in which the influence of the stray light component is largely suppressed. If the third pulse count value PC3 when the particulate concentration is 0 (zero) is set to PC3(0), and the pulse count value at the reference concentration Do is set to PC3(Do), the S/N ratio can be simply calculated by the following calculation expression (Expression 5-a). The purpose of the above calculation is to determine the magnitude of the S/N ratio. Thus, (Expression 5-b) being a more simplified expression may be used as a determination expression.

$S/N = PC3(Do)/PC3(0) - 1$ (Expression 5-a)

$S/N = PC3(Do)/PC3(0)$ (Expression 5-b)

Regarding an order of adjustment of the above-described manufacturing variation and adjustment including temperature correction in the inspection processing in addition to setting of the SPAD area, the adjustments and setting are desirably performed in order of (1) to (5) as follows. (1) Adjustment of the reverse bias voltage VHV, (2) selection of the measurement area MA in the SPAD array (stray light adjustment), (3) adjustment of the number of SPAD cells (adjustment of a noise count value), (4) adjustment of the emitted light quantity (adjustment of inclination), and (5) temperature correction (adjustment of the temperature correction coefficients of the inclination and the stray light and storing of stray light initial value). It is possible to uniquely determine characteristics of the particulate detection sensor 1B by performing the adjustment in such an order. Thus, it is possible to largely reduce an inspection time in the inspection processing. For example, in a case where (2) is finally performed, the setting value adjusted until that is deviated, and thus it is desirable to perform settings of (3) to (5) again. Thus, the inspection time becomes longer, and finally cost increases.

FIG. 13 illustrates the SPAD array configured by 12×12 SPAD cells cell. However, the embodiment is not necessarily limited to the setting of the SPAD array. The measurement area MA is also a square area constituted by the 2×2 reference areas BA, but the embodiment is not necessarily limited to such a selection method. For example, the measurement area MA may be an area constituted by the reference area BA0 to the reference area BA3 in the first column, an area constituted by the reference area BA0, the reference area BA4, the reference area BA8, and the reference area BA12 in the first row, or a circular area. It is desirable to set the measurement area MA by the adjustment method suitable for each particulate detection sensor 1B.

Optical Filter

In Embodiment 1 and Embodiment 2, a method of removing the dark pulse generated by thermal carriers and the pulse count value of the noise component caused by the disturbance light, by subtracting the second pulse count value PC2 in the lighting-off period from the first pulse count value PC1 in the lighting period. Noise removal for incidence of the disturbance light may be insufficient only by the method described in Embodiment 1 and Embodiment 2. The above method is effective when the disturbance light incident to the SPAD array light detecting unit 30B is relatively weak. However, when the disturbance light is strongly incident, there is a problem that it is not possible to accurately measure the particulate concentration. The reason is as follows. That is, when the disturbance light is strongly incident, the pulse count value of the noise component is large. Thus, as described above, the inclination of the count value of the scattered light component with respect to the particulate concentration fluctuates (linearity decrease).

In order to avoid an occurrence of such a problem, it is desirable that an optical filter (not illustrated) that suppresses the incidence of the disturbance light is provided in an upper surface direction of the SPAD array light detecting unit 30B (direction in which the scattered light is incident, and direction perpendicular to a light detecting surface). Specifically, it is desirable that an optical bandpass filter which causes only light having a wavelength in the vicinity of the wavelength of the scattered light component (in the vicinity of the light emission wavelength of the light emitting element 10) to be transmitted therethrough and exponentially attenuates light having other wavelengths is desirably provided. As an installation method of the optical bandpass filter, a configuration in which a commercial (ready-made) optical glass filter is installed in a light detecting surface direction (light incident direction) of the SPAD array light detecting unit 30B may be made. Alternatively, the optical filter may be directly formed on a SPAD array light detecting surface by vapor deposition or the like. As described above, since the optical bandpass filter is provided in the upper surface direction of the SPAD array light detecting unit 30B, it is possible to exponentially attenuate light (that is, disturbance light noise) having a wavelength other than the wavelength of the scattered light. As a result, it is possible to suppress the decrease of linearity, which is caused by an increase of the count value of the noise component by the incidence of the disturbance light. Thus, it is possible to realize the particulate detection sensor 1B having high measurement accuracy of the particulate concentration even in a situation in which the disturbance light is strongly incident.

Integration of Constituent Components

In Embodiment 1 to Embodiment 3, it is desirable that the SPAD array light detecting unit 30B and other constituent components except for the light emitting element 10 are integrated and formed on the same semiconductor substrate. Thus, it is possible to form wires between circuits to be short. Thus, for example, it is possible to suppress the noise component generated by coupling the electromagnetic noise or the like to the wires between the constituent components, and to further improve the measurement accuracy of the particulate concentration. It is possible to reduce the number of components constituting the particulate detection sensor 1B by integrating and forming the constituent components on the same substrate. It is possible to realize size reduction and reduced cost of the particulate detection sensor.

Embodiment 4

Figure 15A:
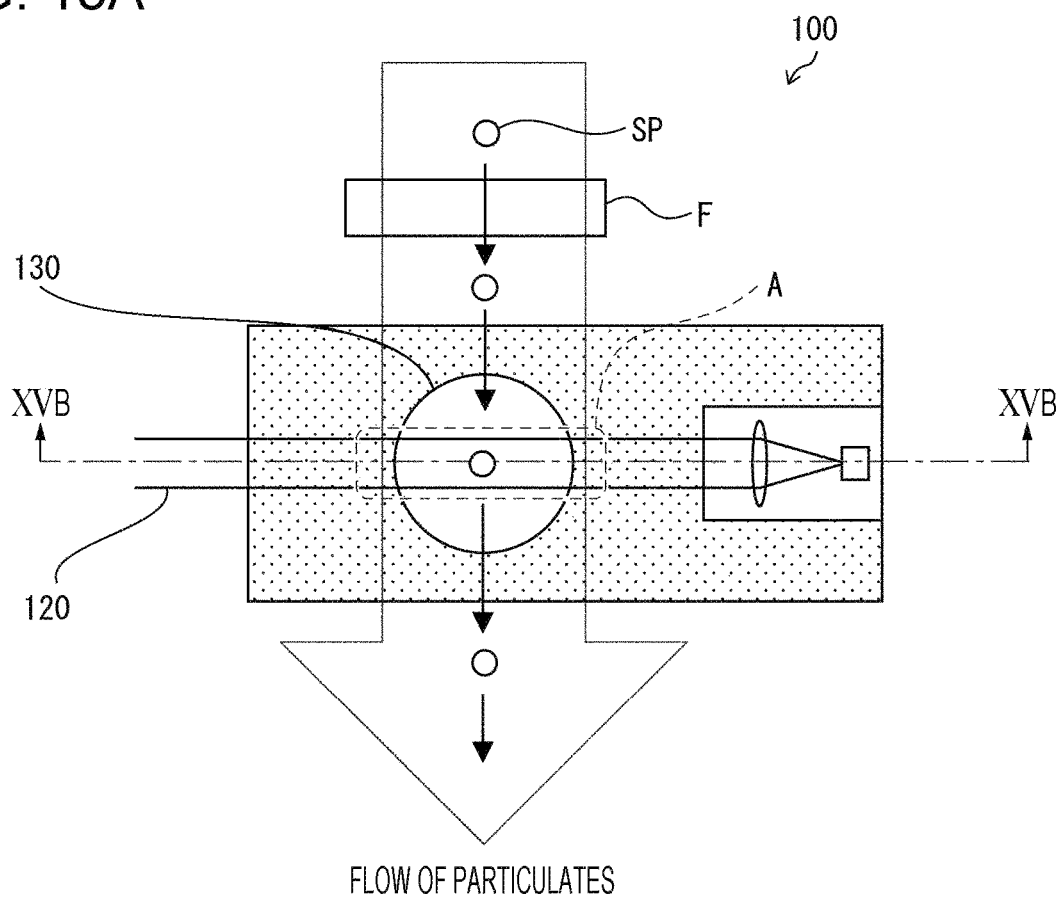
FIGS. 15A and 15B are schematic diagrams illustrating examples of an overall configuration of a dust sensor according to Embodiment 4 of the present disclosure.
Figure 15B:
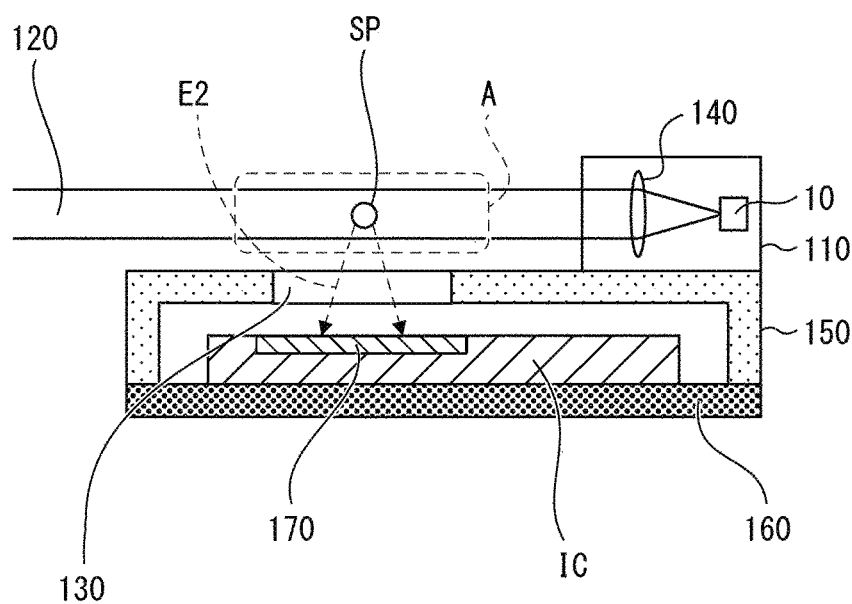

In Embodiment 4, a configuration example of a dust sensor 100 will be described. The dust sensor 100 uses the particulate detection sensor 1 to the particulate detection sensor 1B and has a purpose for detecting concentration of dust particulates floating in an air (or gas). FIGS. 15A and 15B are schematic diagrams illustrating examples of an overall configuration of the dust sensor 100 according to Embodiment 4 of the present disclosure. FIG. 15A is a view when the dust sensor 100 is viewed from the top. FIG. 15B is a sectional view taken along XVB-XVB in FIG. 15A.

In the dust sensor 100 illustrated in FIGS. 15A and 15B, an integrated circuit IC is mounted on a mounting substrate 160. Circuit elements including at least the SPAD array light detecting unit 30B, the pulse counter 40, the driving unit 20 of the light emitting element 10, the control unit 60, and the signal processing unit 50 are included in the integrated circuit IC (configuration in the above-described embodiment). Further, a sensor cover (light shielding cover) 150 is attached onto the mounting substrate 160 to cover the integrated circuit IC. The sensor cover 150 is used for suppressing incidence of disturbance light or stray light to the SPAD array light detecting unit 30B. A light detecting window 130 (being a portion through which scattered light E2 is transmitted, for example, hole) for taking the scattered light E2 from dust particulates SP into the SPAD array light detecting unit 30B is provided at an upper surface portion of the sensor cover 150 just above a SPAD array 170.

Further, an optical bandpass filter is also installed at the portion for the light detecting window 130 and suppresses the incidence of the disturbance light to the SPAD array light detecting unit 30B. A light emitting element module 110 for projecting an emitted light beam 120 is attached to the upper surface of the sensor cover 150. The light emitting element module 110 includes at least the light emitting element 10 and optical elements such as a lens 140. The light emitting element module 110 and (the driving unit of) the integrated circuit IC are electrically connected to each other. The emitted light beam 120 is projected in parallel to the upper surface of the sensor cover 150, in a direction from the light emitting element module 110 toward the light detecting window 130 (SPAD array light detecting unit 30B). Here, a portion at which the emitted light beam 120 overlaps a viewing angle of the SPAD array light detecting unit 30B is set to a detection area A of the dust sensor 100. The viewing angle of the SPAD array light detecting unit 30B is determined by a viewing angle of the SPAD array 170, a viewing angle of the optical bandpass filter, the arrangement of the light detecting window 130, and the like.

A blowing section F for blowing an air (gas) in the vicinity of the upper surface of the light detecting window 130 is installed on a side surface of the dust sensor 100. The dust particulates SP are sent to the detection area A at a constant speed (arrow in FIG. 15A) by the flow of the air (gas). When the dust particulates SP sent by the blowing section F pass through the detection area A, the emitted light beam 120 is scattered by the dust particulates SP, and the scattered light E2 is incident to the SPAD array light detecting unit 30B. As described in the above embodiments, the pulse counter 40 counts a pulse signal depending on the light quantity of the scattered light E2, and calculation is performed with the calculation coefficient. In this manner, it is possible to detect the concentration of the dust particulate SP. As the blowing section F, a blowing section using a temperature difference by a heater or a pressure difference can be used in addition to a blower such as a fan.

In FIGS. 15A and 15B, position shift of (1) and (2) as follows is considered. (1) Shift of the mounting position when the SPAD array 170(IC) is mounted on the mounting substrate 160 (2) Shift of the incident position of the stray light component incident to the SPAD array light detecting unit 30, which is caused by manufacturing variation such as the position shift of the emitted light beam 120. Even though the above shifts occurs, it is possible to suppress the influence of the stray light component by setting the area of the light detecting window 130 to be wider than the detection area A (diameter of the emitted light beam). This is because the measurement area MA of the SPAD array light detecting unit 30B, which causes the influence of the stray light component to be minimized, as described with reference to FIGS. 13 to 14B, can be adjusted (optimized).

With the configuration in FIGS. 15A and 15B, it is possible to detect the particulate concentration of dust particulates floating in the air (gas). It is possible to realize the dust sensor 100 which has a small sensor size, is strong against the incidence of the disturbance light noise, has high measurement accuracy of the dust particulate concentration, and in which the influence of the change of the ambient temperature is small, and it is possible to suppress the influence of the stray light component.

The configuration of the dust sensor 100 is not limited to the configuration illustrated in FIGS. 15A and 15B. In FIGS. 15A and 15B, the configuration of the dust sensor 100 that basically receives scattered light E2 in the vicinity of a direction of 90° from an emitted light beam direction being a direction in which the emitted light beam 120 is projected is provided. However, if the arrangement of the SPAD array 170, the light detecting window 130, and a particulate intake position (flow) is adjusted, it is possible to realize the dust sensor 100 that basically receives scattered light in a direction of 90° or more from the emitted light beam direction or scattered light in a direction of 90° or smaller from the emitted light beam direction. In a case where the particulates are used in an environment in which the particulates are taken into the detection area A with high efficiency even though the blowing section F is not installed, the installation of the blowing section F is not desired. Thus, it is possible to reduce the number of components and to suppress a cost increase of the dust sensor 100.

If the dust sensor 100 is mounted in an air conditioning device, it is possible to realize an air conditioning device 200 including a dust concentration detection unit in which it is possible to accurately detect the concentration of particulates of PM2.5 or the like, and the measurement error with respect to the incidence of the disturbance light or the fluctuation of the ambient temperature is small.

Figure 16:
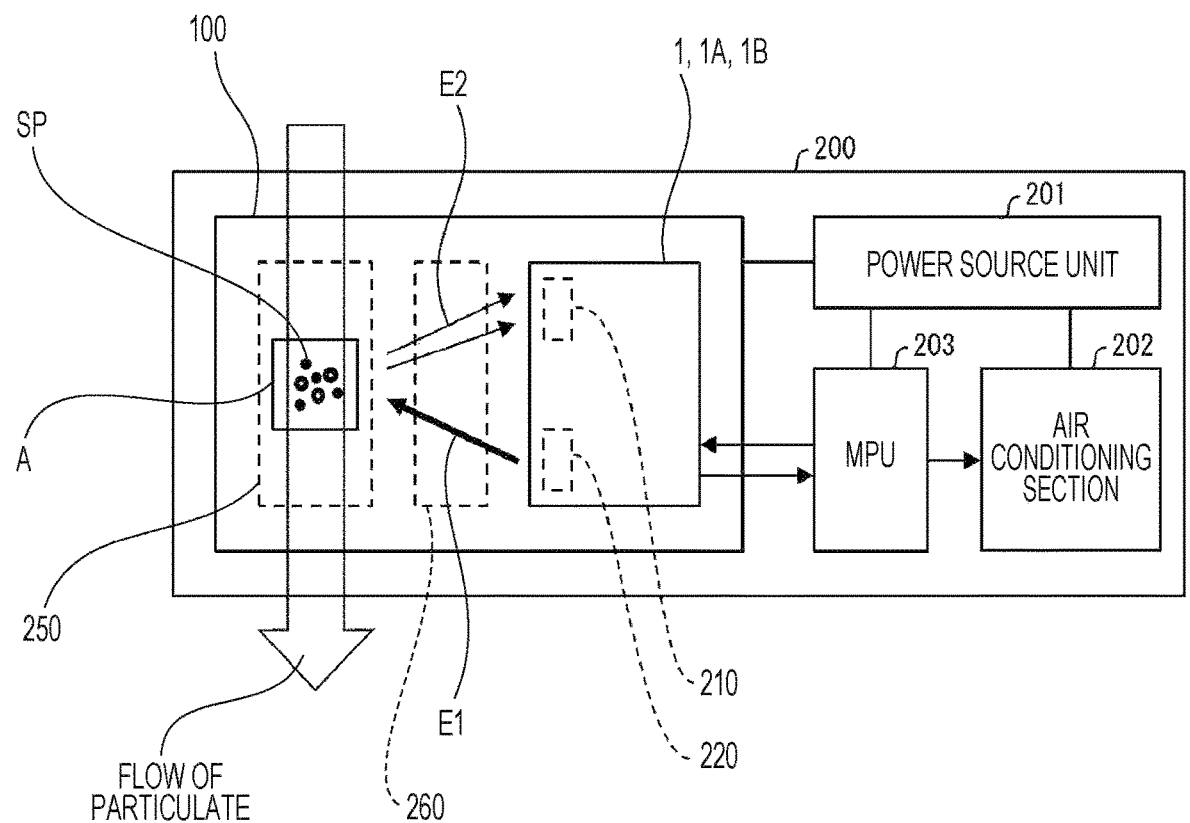
FIG. 16 is a schematic diagram illustrating an example of an overall configuration of an air conditioning device of the present disclosure.
Figure 17:
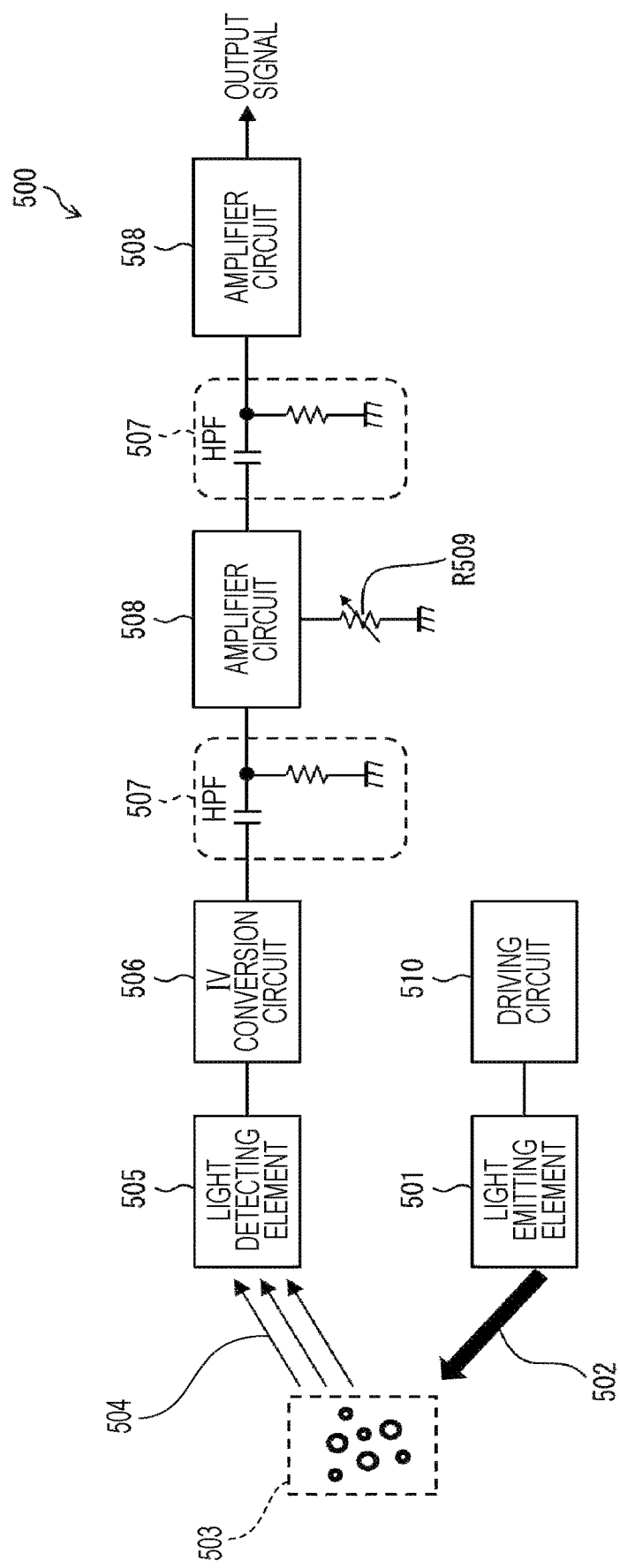
FIG. 17 is a schematic diagram illustrating an example of a circuit configuration of a dust sensor in the related art.
Figure 18A:
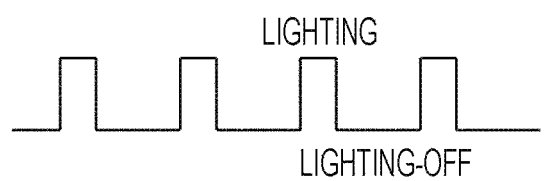
FIGS. 18A and 18B are diagrams illustrating examples of an operation waveform of the dust sensor.
Figure 18B:
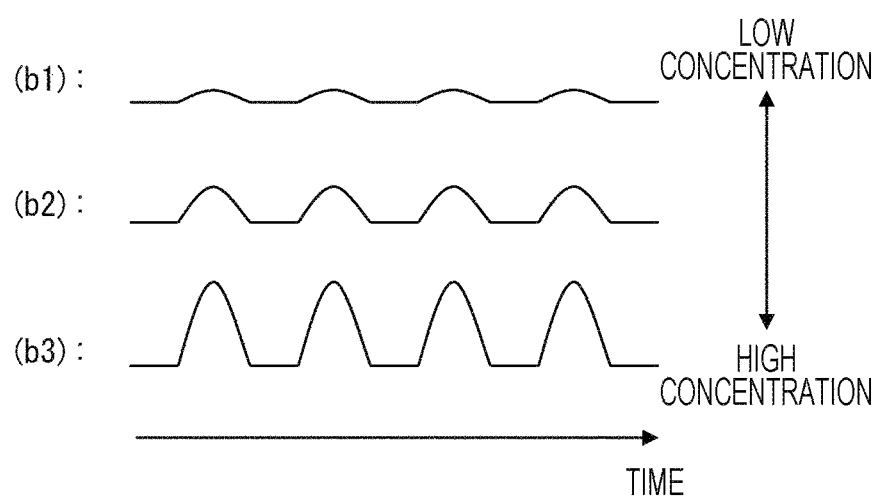
Figure 19:
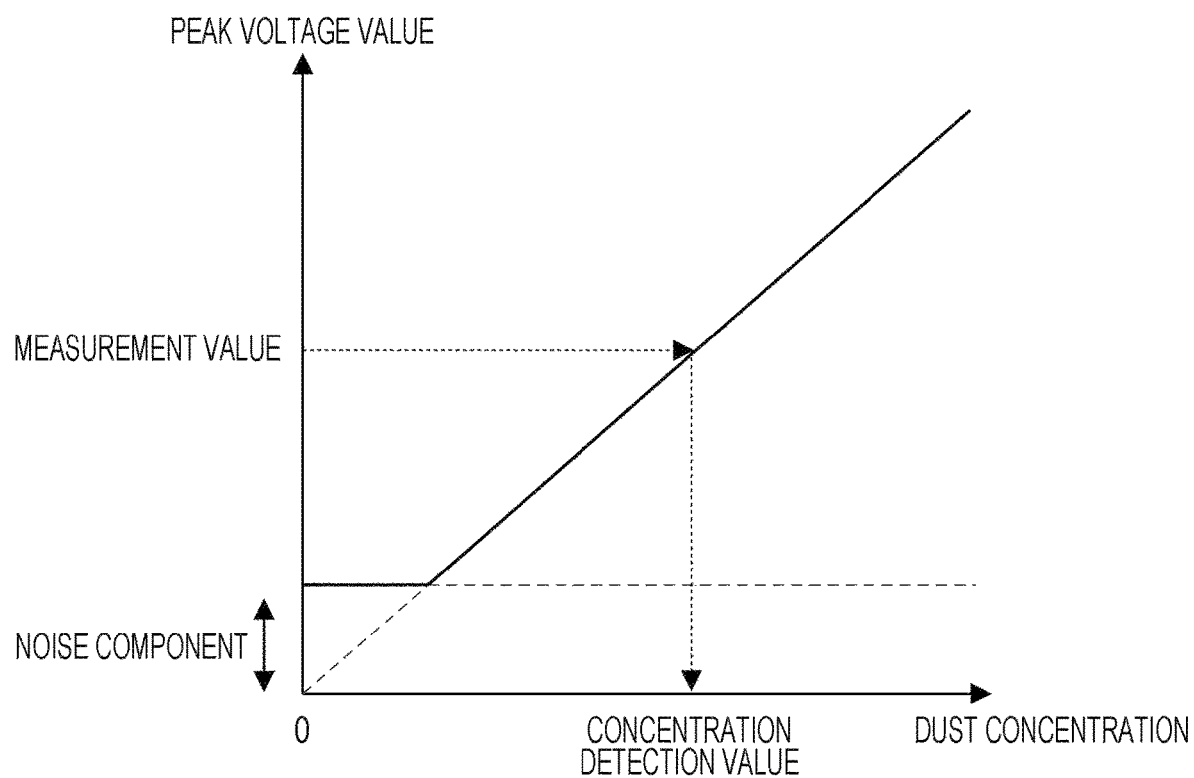
FIG. 19 is a graph illustrating dependency of a peak voltage value in the pulse signal on dust concentration.
Figure 20A:
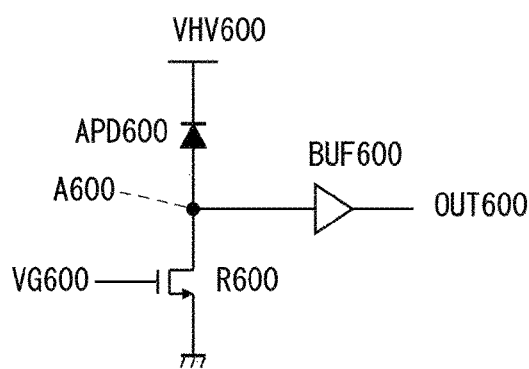
FIG. 20A is a diagram illustrating an example of a circuit configuration in which an active quenching resistor is added in series to an avalanche photodiode in a Geiger mode and FIG. 20B is a diagram illustrating an operation waveform of the circuit in FIG. 20A.
Figure 20B:
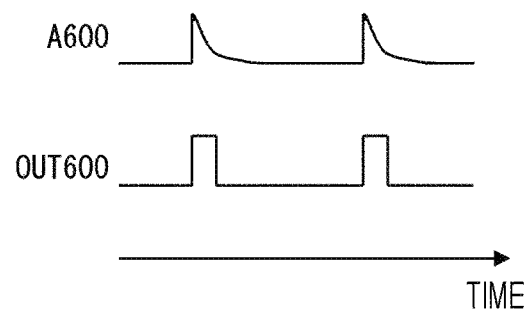

FIG. 16 is a schematic diagram illustrating an example of an overall configuration of the air conditioning device 200 of the present disclosure. The air conditioning device 200 can be realized by an air purifier, an air conditioner, a ventilation fan, or the like. The air conditioning device 200 includes a power source unit 201, an air conditioning section 202, a micro-processing unit (MPU) 203, and the dust sensor 100. The power source unit 201 supplies a power source voltage to the air conditioning section 202, the MPU 203, and the dust sensor 100. The air conditioning section 202 is a unit configured to perform air conditioning such as air control and ventilation. The MPU 203 has a function to control the operation of the air conditioning device 200 and the dust sensor 100 and to further control the air volume or an ON/OFF operation of the air conditioning device 200 in accordance with dust concentration information output from the dust sensor 100. A configuration in which the MPU 203 performs calculation of the particulate concentration, averaging processing of the particulate concentration, and the like with an output result (pulse count value and the like) of (the particulate detection sensor 1, 1A, or 1B in the dust sensor 100) the dust sensor 100.

The dust sensor 100 illustrated in FIG. 16 includes the particulate detection sensor 1, 1A, or 1B described in the above embodiments, the detection area A, a particulate intaking section 250, and an optical section 260. Here, the detection area A is an area for detecting floating particulates. The projection light E1 projected from the particulate detection sensor 1, 1A, or 1B is scattered by the particulates SP floating in the detection area A. The particulate concentration is detected in a manner that the particulate detection sensor 1, 1A, or 1B receives the scattered light E2.

The particulate intaking section 250 is a section for taking the particulates (dust particles) SP in from the outside of the dust sensor 100, sending the particulates to the detection area A, discharging the particulates SP from the detection area A, and further discharging the particulates SP to the outside of the dust sensor 100. The particulate intaking section 250 is configured by the blowing section F for taking and further discharging particulates (air) from the outside of the dust sensor 100, a path of the particulate SP for sending the particulate SP to the detection area A and discharging the particulate SP, an inlet for taking the particulate SP in from the outside of the dust sensor 100, and an outlet for discharging the particulate SP to the outside.

The optical section 260 is configured by (1) to (5) and the like as follows. (1) Optical component such as the lens for condensing the projection light E1 projected from the particulate detection sensor 1, 1A, or 1B to the detection area A, (2) optical path of the projection light E1, (3) optical path for receiving the scattered light E2 from the detection area A, (4) light detecting window for taking the scattered light E2 into the light detecting unit 210 in the particulate detection sensor 1, 1A, or 1B, (5) light shielding cover (sensor cover) for suppressing the incidence of undesirable light (stray light or disturbance light) to the particulate detection sensor 1, 1A, or 1B, and (6) optical trap structure for suppressing an occurrence of a situation in which stray light is incident to the particulate detection sensor 1, 1A, or 1B.

Implementation Example by Software

The control block (in particular, signal processing unit 50) of the particulate detection sensor 1, 1A, or 1B may be implemented by logical circuits (hardware) formed by an integrated circuit (IC chip) or by software.

In the latter case, the particulate detection sensor 1, 1A, or 1B includes a computer that executes commands of a program being software that implements the functions. The computer includes, for example, at least one processor (control device) and includes at least one computer readable recording medium in which the program is stored. The object of the present disclosure is achieved in a manner that the processor in the computer reads and executes the program from the recording medium. As the processor, for example, a central processing unit (CPU) can be used. As the recording medium, a tape, a disk, a card, a semiconductor memory, a programmable logical circuit, and the like can be used in addition to "a non-temporary tangible medium" such as a read only memory (ROM). The computer may further include a random access memory (RAM) and the like in which the program is developed. The program may be supplied to the computer through any transmission medium (communication network, broadcast wave, or the like) capable of transmitting the program. An aspect of the present disclosure may be embodied by a form of a data signal which is obtained by embodying the program by electronic transmission and is embedded in a carrier wave.

CONCLUSION

According to Aspect 1 of the present disclosure, the particulate detection sensor (1, LA, or 1B) is a particulate detection sensor that detects concentration of a particulate in a fluid. The particulate detection sensor includes the light emitting element (10) that projects light to the particulate, the SPAD array light detecting unit (30 or 30B) that includes a plurality of single photon avalanche diodes (SPADs), receives light projected from the light emitting element and scattered by the particulate, and outputs a pulse signal, the single photon avalanche diodes being arranged in an array and operating in a Geiger mode, and the signal processing unit (50) that calculates the concentration of the particulate based on a pulse count value being a value obtained by counting the pulse signal. The signal processing unit calculates the concentration of the particulate based on the first pulse count value (PC1) and the second pulse count value (PC2), the first pulse count value (PC1) being a pulse count value of the pulse signal in the lighting period (ONT) in which the light emitting element projects the light, the second pulse count value (PC2) being a pulse count value of the pulse signal in the lighting-off period (OFFT) in which the light emitting element does not project the light.

According to this configuration, since weak scattered light received by the SPAD array light detecting unit is output as a digitized pulse signal, and pulse counting of the pulse signal is performed, it is possible to realize a particulate detection sensor which is capable of receiving the weak scattered light and has high measurement accuracy.

Further, since a configuration in which the amplifier circuit having a high gain amplifies an analog signal is not desired, the resistance against the electromagnetic noise becomes strong. It is possible to reduce the number of components for measures for the electromagnetic noise, such as a shield case or a filter which is indispensable for a dust sensor in the related art. In addition, it is possible to realize size reduction of the particulate detection sensor and cost reduction.

According to Aspect 2 of the present disclosure, in the particulate detection sensor (1, 1A, or 1B), in Aspect 1, the length of a period (first pulse counting period PT1) in which the first pulse count value (PC1) is counted in the lighting period (ONT) may be equal to the length of a period (second pulse counting period PT2) in which the second pulse count value (PC2) is counted in the lighting-off period (OFFT).

According to this configuration, since the pulse counting periods in the lighting period of the light emitting element and in the lighting-off period thereof are set to be equal to each other, it is possible to remove the noise component with higher accuracy, and to realize a particulate detection sensor having improved resistance against the ambient temperature or the incidence of the disturbance light.

According to Aspect 3 of the present disclosure, in the particulate detection sensor (1, 1A, or 1B), in Aspect 1 or 2, the signal processing unit (50) may calculate the third pulse count value (PC3) by subtracting the second pulse count value (PC2) from the first pulse count value (PC1), and calculate the concentration of the particulate based on the third pulse count value.

According to this configuration, since the second pulse count value in the lighting-off period and the first pulse count value in the lighting period are subtracted, it is possible to remove the noise component which is thermally generated and the noise component which is generated by the incidence of the disturbance light. Thus, it is possible to realize a particulate detection sensor having high resistance against the change of the ambient temperature or the incidence of the disturbance light.

Since the configuration in which the signal processing unit that calculates the particulate concentration also performs the subtraction processing of the pulse count value is made, there are effects in that it is possible to flexibly set the calculation method of the particulate concentration, the response speed is improved by reducing the number of calculations, and the cost is reduced by reducing the circuit size of the signal processing unit.

According to Aspect 4 of the present disclosure, in any one of Aspects 1 to 3, the particulate detection sensor (1, 1A, or 1B) may further include the pulse counter (40) that counts the pulse signal. The pulse counter may be configured by an UP/DOWN counter, and may count up the pulse signal in the lighting period (ONT) and count down the pulse signal in the lighting-off period (OFFT).

According to this configuration, since the UP/DOWN counter is set as the pulse counter, the subtraction processing of the pulse count value in the signal processing unit is not desired. Thus, an effect of further reducing the cost by reducing the circuit size of the signal processing unit is obtained.

According to Aspect 5 of the present disclosure, in any one of Aspects 1 to 4, the particulate detection sensor (1A) may further include the temperature detection unit (70) that measures an ambient temperature of the SPAD array light detecting unit (30), and the voltage setting unit (80) that supplies the reverse bias voltage (VHV) to the SPAD array light detecting unit, the reverse bias voltage (VHV) being determined in accordance with a measurement result of the ambient temperature (T). The ambient temperature is measured in the temperature detection period (TT) by the temperature detection unit. The reverse bias voltage is updated in the voltage setting period (VT) by the voltage setting unit in accordance with the measurement result of the ambient temperature. The temperature detection period and the voltage setting period are set in synchronization with the measurement period (MT) including the period (first pulse counting period PT1) in which the first pulse count value (PC1) is counted in the lighting period (ONT) and the period (second pulse counting period PT2) in which the second pulse count value (PC2) is counted in the lighting-off period (OFFT).

According to this configuration, it is possible to automatically adjust the reverse bias voltage to be supplied to the SPAD array light detecting unit to the optimum value with respect to the change of the ambient temperature. Thus, it is possible to realize a particulate detection sensor having a wide operable temperature range. In addition, the temperature measurement period in the temperature detection unit and an adjustment period of the reverse bias voltage are set in synchronization with the measurement period configured by the lighting period and the lighting-off period of the light emitting element. Thus, it is possible to make a configuration in which the reverse bias voltage does not fluctuate in the measurement period. As a result, it is possible to realize more stable measurement.

According to Aspect 6 of the present disclosure, in the particulate detection sensor (1A), in Aspect 5, the signal processing unit (50) may perform temperature correction on the preset first calculation coefficient (x1), which is preset and used for calculating the concentration of the particulate, with the temperature correction coefficient (y1) that is preset and the measurement result of the ambient temperature measured by the temperature detection unit, and calculates the second calculation coefficient (x2). The first calculation coefficient (x1) is used for calculating the concentration of the particulate. The signal processing unit (50) may calculate the concentration of the particulate with the second calculation coefficient and the third pulse count value (PC3) obtained by subtracting the second pulse count value (PC2) from the first pulse count value (PC1).

According to this configuration, since temperature correction is performed on the calculation coefficient of the particulate concentration by using the detection result of the ambient temperature, it is possible to realize a particulate detection sensor in which the measurement error of the particulate concentration, which is caused by the change of the ambient temperature is suppressed.

According to Aspect 7 of the present disclosure, in the particulate detection sensor (1A), in Aspect 6, the temperature correction coefficient (y1) may be calculated based on the measurement result of the concentration of the particulate at least two or more temperatures, in the inspection processing when the particulate detection sensor is manufactured.

According to this configuration, since the temperature correction coefficient for performing the temperature correction is detected in the inspection processing in manufacturing, and is stored in the storage unit as an initial setting value, it is possible to realize a particulate detection sensor in which an influence of variation in temperature dependency with respect to manufacturing variation is suppressed.

According to Aspect 8 of the present disclosure, in Aspect 5, the particulate detection sensor (1A) may further include the control unit (80) that controls the driving unit (20) driving the light emitting element (10), the SPAD array light detecting unit (30), and the voltage setting unit (80). The control unit has a function to output the first adjustment signal (S1), the second adjustment signal (S2), and the third adjustment signal (S3) for respectively adjusting operation conditions of the driving unit, the SPAD array light detecting unit, and the voltage setting unit. The driving unit has a function to adjust a quantity of light to be emitted from the light emitting element with the first adjustment signal. The SPAD array light detecting unit has a function to set each of SPAD cells constituting the SPAD array light detecting unit to be valid or invalid, with the second adjustment signal. The voltage setting unit has a function to adjust the reverse bias voltage with the third adjustment signal. The first adjustment signal, the second adjustment signal, and the third adjustment signal are determined based on an inspection result in inspection processing when the particulate detection sensor is manufactured.

According to this configuration, it is possible to adjust (correct the manufacturing variation) the deviation in the optimum value of the reverse bias voltage, the pulse count value caused by the noise component, and the deviation of the inclination of the pulse count value with respect to the particulate concentration, for each particulate detection sensor. In addition, it is possible to suppress the manufacturing variation in characteristics of each particulate detection sensor, and to realize a particulate detection sensor that satisfies target performance (measurement accuracy and the like) desired for a particulate detection sensor.

According to Aspect 9 of the present disclosure, in the particulate detection sensor (1A) in any one of Aspects 1 to 8, in inspection processing when the particulate detection sensor is manufactured, the fourth pulse count value (PC4) being a pulse count value of a stray light component in a state where there is no particulate may be measured. When the signal processing unit (50) calculates the concentration of the particulate, the fourth pulse count value may be subtracted from the third pulse count value (PC3) obtained by subtracting the second pulse count value (PC2) from the first pulse count value (PC1).

According to this configuration, it is possible to realize a particulate detection sensor in which it is possible to suppress the measurement error by the incidence of the stray light component.

According to Aspect 10 of the present disclosure, in the particulate detection sensor (1A), in Aspect 9, the fourth pulse count value (PC4) may be subjected to temperature correction with a measurement result obtained by the temperature detection unit (70) that measures the ambient temperature of the SPAD array light detecting unit (30).

According to this configuration, it is possible to correct the fluctuation of the influence of the stray light component with respect to the change of the ambient temperature. It is possible to realize a particulate detection sensor in which it is possible to suppress the measurement error with respect to the change of the ambient temperature even in the sensor in which it is not possible to ignore the incidence of the stray light component.

According to Aspect 11 of the present disclosure, in the particulate detection sensor (1B), in Aspect 8, (11) the SPAD array light detecting unit (30B) may have a function to divide a SPAD array area in which the plurality of SPADs are arranged in an array into at least two or more reference areas (BA) and to select at least one of the reference areas as the measurement area (MA). The second adjustment signal (S2) may be set to select the measurement area such that the value obtained by dividing the third pulse count value (PC3) by the fourth pulse count value (PC4) is set to be the maximum. The third pulse count value (PC3) is obtained by subtracting the second pulse count value (PC2) from the first pulse count value (PC1), and the fourth pulse count value (PC4) is a pulse count value of the pulse signal in the lighting period (ONT) in a state where there is no particulate in the inspection processing when the particulate detection sensor is manufactured.

According to this configuration, it is possible to select the measurement area of the SPAD array area such that the ratio between the scattered light component and the stray light component incident to the SPAD array light detecting unit is the maximum. Therefore, it is possible to realize a particulate detection sensor in which it is possible to suppress the influence due to the shift of the incident position of the stray light component with respect to the manufacturing variation. In addition, with this configuration, there are effects in that it is possible to reduce the occurrence rate of a defective product by the large incident quantity of the stray light component, and cost is reduced by improving the non-defective rate of a particulate detection sensor.

According to Aspect 12 of the present disclosure, in the particulate detection sensor (1, 1A, or 1B), in any one of Aspects 1 to 11, the SPAD array light detecting unit (30 or 30B) may include the optical bandpass filter that causes only light having a wavelength in a vicinity of a light emission wavelength of the light emitting element (10) to be transmitted, in an incident direction of the scattered light.

According to this configuration, even when the disturbance light is strongly incident to the SPAD array light detecting unit, it is possible to suppress the increase of the pulse count value by the disturbance light component. Thus, it is possible to realize a particulate detection sensor having high resistance against the incidence of the disturbance light noise.

According to Aspect 13 of the present disclosure, in the particulate detection sensor (1, 1A, or 1B), in any one of Aspects 1 to 12, at least two or more of components other than the light emitting element may be integrated on an identical semiconductor substrate.

According to this configuration, since at least two or more of circuit constituent components other than the light emitting element are formed on the same semiconductor substrate, it is possible to reduce the number of components constituting a particulate detection sensor, and thus it is possible to realize size reduction and cost reduction of the particulate detection sensor. Further, it is possible to shorten the wire between the constituent components by forming the constituent components on the same substrate. Thus, the noise by coupling of the electromagnetic noise to the wire is reduced, and thus it is possible to realize a particulate detection sensor having high resistance against the electromagnetic noise.

According to Aspect 14 of the present disclosure, in the particulate detection sensor (1, 1A, or 1B), in Aspect 1, the lighting period (ONT), the lighting-off period (OFFT), the first pulse counting period (PT1), and the second pulse counting period (PT2) may be controlled as predetermined periods. The first pulse counting period (PT1) is a period in which the first pulse count value (PC1) is counted in the lighting period, and the second pulse counting period (PT2) is a period in which the second pulse count value (PC2) is counted in the lighting-off period (OFFT). The first pulse counting period may be controlled in synchronization with the lighting period. The second pulse counting period may be controlled in synchronization with the lighting-off period. Measurement in the lighting period and the lighting-off period may be repeated at least one time or more.

According to this configuration, since the measurement is repeated, and the particulate concentration is detected by calculation with the cumulative pulse count value, it is possible to reduce the measurement error. Specifically, if the number of times of measurement is set to N, it is possible to reduce the measurement error to $1/\sqrt{N}$ times the measurement error in one measurement. Therefore, it is possible to realize a particulate detection sensor having higher measurement accuracy.

According to Aspect 15 of the present disclosure, the dust sensor (100) may include the particulate detection sensor (1, 1A, or 1B) in any one of Aspects 1 to 14. The dust sensor (100) may have the detection area (A) for detecting a dust particulate floating in a gas and detect concentration of the dust particulate.

According to this configuration, since dust particulates in the air are taken into the area (detection area) in which the emitted light beam overlaps the viewing angle of the SPAD array light detecting unit, it is possible to realize a dust sensor as follows. That is, it is possible to realize a dust sensor in which it is possible to detect the concentration of dust particulates floating in an air, the measurement accuracy is high, the resistance against the fluctuation of the ambient temperature or the incidence of the disturbance light is high, and the measurement error caused by the manufacturing variation is small.

According to Aspect 16 of the present disclosure, an air conditioning device (200) may include the dust sensor (100) in Aspect 15.

According to this configuration, it is possible to realize an air conditioning device including a dust concentration detection unit having high measurement accuracy, high resistance against the fluctuation of the ambient temperature or the incidence of the disturbance light, and the small measurement error caused by the manufacturing variation.

According to Aspect 17 of the present disclosure, a control method of the particulate detection sensor (1, 1A, or 1B) that detects concentration of a particulate in a fluid. The control method includes projecting light to the particulate by a light emitting element, receiving light projected from the light emitting element and scattered by the particulate, and outputting a pulse signal, by a SPAD array light detecting unit including a plurality of SPADs which are arranged in an array and operate in a Geiger mode, and calculating the concentration of the particulate based on a pulse count value being a value obtained by counting the pulse signal, by a signal processing unit. In the calculating the concentration of the particulate, the concentration of the particulate is calculated based on a first pulse count value and a second pulse count value, the first pulse count value being a pulse count value of the pulse signal in a lighting period in which the light emitting element projects the light, the second pulse count value being a pulse count value of the pulse signal in a lighting-off period in which the light emitting element does not project the light. According to this configuration, effects similar to those in Aspect 1 are exhibited.

The particulate detection sensor 1, 1A, or 1B according to the aspects of the present disclosure may be implemented by a computer. In this case, a control program of the particulate detection sensor 1, 1A, or 1B, which is used for implementing the particulate detection sensor 1, 1A, or 1B with the computer by operating the computer as the units (software elements) in the particulate detection sensor 1, 1A, or 1B, and a computer readable recording medium in which the control program is recorded are within the scope of the present disclosure.

The disclosure is not limited to the above-described embodiments, and various changes can be made within the scope of the claims. An embodiment obtained by appropriately combining technical means disclosed in the different embodiments is also included in the technical scope of the present disclosure. Further, a new technical feature can be formed by combining the technical means disclosed in the embodiments.

The present disclosure contains subject matter related to that disclosed in U.S. Provisional Patent Application No. 62/800,250 filed in the US Patent Office on Feb. 1, 2019, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A particulate detection sensor that detects concentration of a particulate in a fluid, the sensor comprising:
   a light emitting element that projects light to the particulate;
   a single photon avalanche diode (SPAD) array light detecting unit that includes a plurality of SPADs, receives light projected from the light emitting element and scattered by the particulate, and outputs a pulse signal, the single photon avalanche diodes being arranged in an array and operating in a Geiger mode; and
   a signal processing unit that calculates the concentration of the particulate based on a pulse count value being a value obtained by counting the pulse signal,
   wherein the signal processing unit calculates the concentration of the particulate based on a first pulse count value and a second pulse count value, the first pulse count value being a pulse count value of the pulse signal in a lighting period in which the light emitting element projects the light, the second pulse count value being a pulse count value of the pulse signal in a lighting-off period in which the light emitting element does not project the light.

2. The particulate detection sensor according to claim 1, wherein a length of a period in which the first pulse count value is counted in the lighting period is equal to a length of a period in which the second pulse count value is counted in the lighting-off period.

3. The particulate detection sensor according to claim 1, wherein the signal processing unit calculates a third pulse count value by subtracting the second pulse count value from the first pulse count value, and calculates the concentration of the particulate based on the third pulse count value.

4. The particulate detection sensor according to claim 1, further comprising:
   a pulse counter that counts the pulse signal,
   wherein the pulse counter is configured by an UP/DOWN counter, and counts up the pulse signal in the lighting period and counts down the pulse signal in the lighting-off period.

5. The particulate detection sensor according to claim 1, further comprising:
   a temperature detection unit that measures an ambient temperature of the SPAD array light detecting unit; and
   a voltage setting unit that supplies a reverse bias voltage to the SPAD array light detecting unit, the reverse bias voltage being determined in accordance with a measurement result of the ambient temperature, wherein
   the ambient temperature is measured in a temperature detection period by the temperature detection unit,
   the reverse bias voltage is updated in a voltage setting period by the voltage setting unit in accordance with the measurement result of the ambient temperature, and the temperature detection period and the voltage setting period are set in synchronization with a measurement period including a period in which the first pulse count value is counted in the lighting period and a period in which the second pulse count value is counted in the lighting-off period.

6. The particulate detection sensor according to claim 5, wherein the signal processing unit performs temperature correction on a first calculation coefficient, which is preset and used for calculating the concentration of the particulate, with a temperature correction coefficient that is preset and the measurement result of the ambient temperature measured by the temperature detection unit, and calculates a second calculation coefficient, and calculates the concentration of the particulate with the second calculation coefficient and a third pulse count value obtained by subtracting the second pulse count value from the first pulse count value.

7. The particulate detection sensor according to claim 6, wherein the temperature correction coefficient is calculated based on a measurement result of the concentration of the particulate at at least two or more temperatures, in an inspection processing when the particulate detection sensor is manufactured.

8. The particulate detection sensor according to claim 5, further comprising:

a control unit that controls a driving unit driving the light emitting element, the SPAD array light detecting unit, and the voltage setting unit, wherein the control unit has a function to output a first adjustment signal, a second adjustment signal, and a third adjustment signal for respectively adjusting operation conditions of the driving unit, the SPAD array light detecting unit, and the voltage setting unit, the driving unit has a function to adjust a quantity of light to be emitted from the light emitting element with the first adjustment signal, the SPAD array light detecting unit has a function to set each of SPAD cells constituting the SPAD array light detecting unit to be valid or invalid, with the second adjustment signal, the voltage setting unit has a function to adjust the reverse bias voltage with the third adjustment signal, and the first adjustment signal, the second adjustment signal, and the third adjustment signal are determined based on an inspection result in inspection processing when the particulate detection sensor is manufactured.

9. The particulate detection sensor according to claim 8, wherein the SPAD array light detecting unit has a function to divide a SPAD array area in which the plurality of SPADs are arranged in an array into at least two or more reference areas and to select at least one of the reference areas as a measurement area, and the second adjustment signal is set to select the measurement area such that a value obtained by dividing a third pulse count value by a fourth pulse count value is set to be the maximum, the third pulse count value being obtained by subtracting the second pulse count value from the first pulse count value, the fourth pulse count value being a pulse count value of the pulse signal in the lighting period in a state where there is no particulate, in the inspection processing when the particulate detection sensor is manufactured.

10. The particulate detection sensor according to claim 1, wherein in inspection processing when the particulate detection sensor is manufactured, a fourth pulse count value being a pulse count value of a stray light component in a state where there is no particulate is measured, and when the signal processing unit calculates the concentration of the particulate, the fourth pulse count value is subtracted from a third pulse count value obtained by subtracting the second pulse count value from the first pulse count value.

11. The particulate detection sensor according to claim 10, wherein the fourth pulse count value is subjected to temperature correction with a measurement result obtained by a temperature detection unit that measures an ambient temperature of the SPAD array light detecting unit.

12. The particulate detection sensor according to claim 1, wherein the SPAD array light detecting unit includes an optical bandpass filter that causes only light having a wavelength in a vicinity of a light emission wavelength of the light emitting element to be transmitted, in an incident direction of the scattered light.

13. The particulate detection sensor according to claim 1, wherein at least two or more of components other than the light emitting element are integrated on an identical semiconductor substrate.

14. The particulate detection sensor according to claim 1, wherein the lighting period, the lighting-off period, a first pulse counting period in which the first pulse count value is counted in the lighting period, and a second pulse counting period in which the second pulse count value is counted in the lighting-off period are controlled as predetermined periods, the first pulse counting period is controlled in synchronization with the lighting period, the second pulse counting period is controlled in synchronization with the lighting-off period, and measurement in the lighting period and the lighting-off period repeats at least one time or more.

15. A dust sensor comprising:

the particulate detection sensor according to claim 1, wherein a detection area for detecting a dust particulate floating in a gas is provided, and the dust sensor detects concentration of the dust particulate.

16. An air conditioning device comprising the dust sensor according to claim 15.

17. A control method of a particulate detection sensor that detects concentration of a particulate in a fluid, the method comprising:

projecting light to the particulate by a light emitting element;

receiving light projected from the light emitting element and scattered by the particulate, and outputting a pulse signal, by a SPAD array light detecting unit including a plurality of SPADs which are arranged in an array and operate in a Geiger mode; and calculating the concentration of the particulate based on a pulse count value being a value obtained by counting the pulse signal, by a signal processing unit, wherein, in the calculating of the concentration of the particulate, the concentration of the particulate is calculated based on a first pulse count value and a second pulse count value, the first pulse count value being a pulse count value of the pulse signal in a lighting period in which the light emitting element projects the light, the second pulse count value being a pulse count value of the pulse signal in a lighting-off period in which the light emitting element does not project the light.

\* \* \* \* \*